United States Patent
Davey

(10) Patent No.: US 12,463,354 B2
(45) Date of Patent: Nov. 4, 2025

(54) RADIO LOCATION FINDING

(71) Applicant: CRFS Limited, Cambridge (GB)

(72) Inventor: Timothy Paul Davey, Cambridgeshire (GB)

(73) Assignee: CRFS Limited, Cambridge (GB)

( * ) Notice: Subject to any disclaimer, the term of this patent is extended or adjusted under 35 U.S.C. 154(b) by 361 days.

(21) Appl. No.: 18/097,700

(22) Filed: Jan. 17, 2023

(65) Prior Publication Data

US 2023/0231323 A1    Jul. 20, 2023

(30) Foreign Application Priority Data

Jan. 17, 2022  (GB) ........................................ 2200553
Feb. 7, 2022  (GB) ........................................ 2201550

(51) Int. Cl.
*G01S 5/14* (2006.01)
*H01Q 21/20* (2006.01)

(52) U.S. Cl.
CPC ............ *H01Q 21/205* (2013.01); *G01S 5/14* (2013.01)

(58) Field of Classification Search
CPC ................................ H01Q 21/205; G01S 5/14
USPC ........................................................ 342/463
See application file for complete search history.

(56) References Cited

U.S. PATENT DOCUMENTS

| | | |
|---|---|---|
| 5,280,751 A | 1/1994 | Muirhead et al. |
| 6,459,903 B1 | 10/2002 | Lee |
| 9,648,456 B2 * | 5/2017 | Jordan ................. G01S 19/13 |
| 2007/0077941 A1 | 4/2007 | Gonia et al. |
| 2010/0183099 A1 | 7/2010 | Toda et al. |
| 2010/0238862 A1 | 9/2010 | Davidson et al. |

(Continued)

FOREIGN PATENT DOCUMENTS

| | | |
|---|---|---|
| CN | 109741480 A * | 5/2019 |
| CN | 112887901 A | 6/2021 |

(Continued)

OTHER PUBLICATIONS

Extended European Search Report of corresponding European Application No. 23152079.2, mailed Jun. 7, 2023.

(Continued)

*Primary Examiner* — Harry K Liu
(74) *Attorney, Agent, or Firm* — Burr & Forman

(57) ABSTRACT

A method of detecting a radio emission source (2) includes receiving three or more radio signal datasets from three or more respective sensors (3). Each sensor (3) corresponds to a physical location and includes at least one radio receiver (4). The three or more radio signal datasets include one or more directional datasets obtained using a directional antenna (9, 23) or a directional antenna array of the corresponding sensor, and two or more omnidirectional datasets, each obtained using an omnidirectional antenna (9, 22) or an omnidirectional antenna array of the corresponding sensor. The method also includes determining whether an emitter signal (8) within a target frequency range is present in any of the one or more directional datasets. The method also includes, for each directional dataset, in response to the emitter signal (8) is present in that directional dataset, carrying out a correlation based time-of-arrival location finding calculation based on that directional dataset and at least two further radio signal datasets.

20 Claims, 13 Drawing Sheets

(56) References Cited

U.S. PATENT DOCUMENTS

2018/0213355 A1 7/2018 Smith et al.
2020/0041606 A1 2/2020 Jones et al.

FOREIGN PATENT DOCUMENTS

| | | | | |
|---|---|---|---|---|
| CN | 118257300 A | * | 6/2024 | |
| EP | 3040598 A1 | * | 7/2016 | ............. F16P 3/145 |
| EP | 3671255 A1 | | 6/2020 | |
| WO | 0233435 A2 | | 4/2002 | |
| WO | 2004040328 A1 | | 5/2004 | |
| WO | 2013121092 A1 | | 8/2013 | |
| WO | WO-2016023528 A1 | * | 2/2016 | ......... G08B 13/2491 |
| WO | 2020218889 A1 | | 10/2020 | |

OTHER PUBLICATIONS

Zhang, et al., "Efficient Indoor Localization via Switched-Beam Antennas," IEEE (Jun. 2019), vol. 19, No. 9, USC.
Combined Search and Examination Report for corresponding application No. GB2200553.2 dated Sep. 20, 2022.
Search Report for corresponding application No. GB2201550.7 dated Aug. 8, 2022.

* cited by examiner

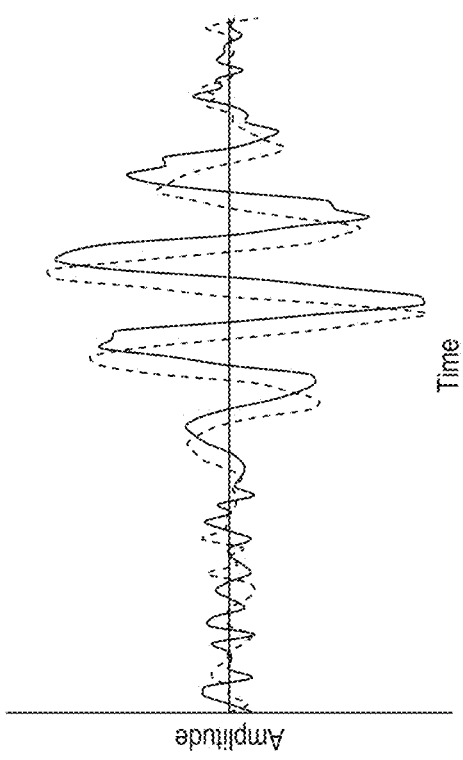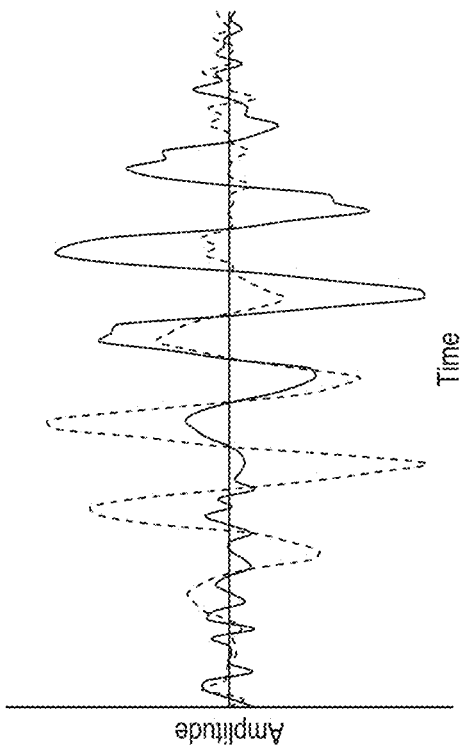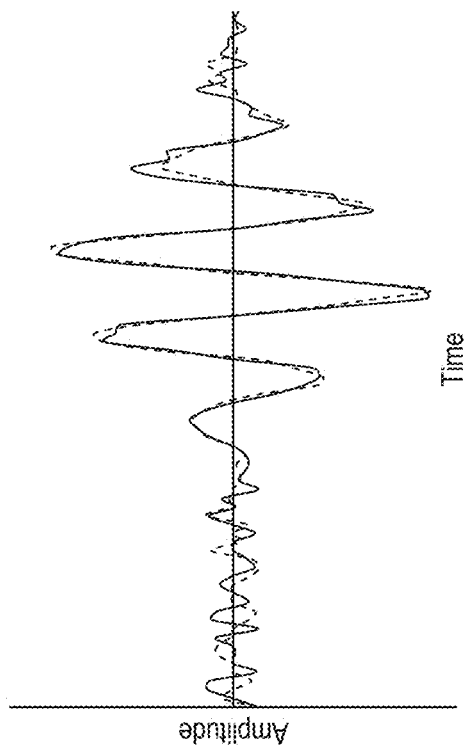

RADIO LOCATION FINDING

FIELD OF THE INVENTION

The present invention relates to methods, apparatuses and systems for passive location finding of radio emission sources using time-of-arrival methods.

BACKGROUND

Detection and location of unauthorised short-burst radio transmitting devices is important for both security and safety applications. Time-of-arrival methods, based on differences in transit time between an actively emitting object and a number of sensors, represent one approach to passively detecting and tracking radio transmitting devices.

One example is the increasing availability and use of unmanned aerial vehicles, or drones, and the issues with drones being flown into restricted airspaces. Detecting unauthorised drones may be important for security/privacy, for example camera drones flown over sporting events for which valuable television rights have been sold. In other situations, drones may be flown (unintentionally or maliciously) over an airport, which can endanger aircraft and force runways to be shutdown leading to long delays.

Drones are often small and mainly made from low density materials such as polymers. Consequently, drones are difficult to locate and/or differentiate from birds using traditional airspace control methods such as radar. Drones may be located by monitoring the radio signals which they emit— for example to update an operator as to the drone location, to transmit still or video images and so forth. Conventionally, this is accomplished by monitoring the narrow ranges of radio spectrum normally used for controlling drones, often in combination with a library of signal patterns for known types of drone. However, such approaches have the drawback that a drone must be known and characterised in advance in order to be detected reliably.

SUMMARY

According to a first aspect of the invention there is provided a method of passively locating a radio emission source, including receiving radio signal datasets corresponding to each of three or more sensors. Each sensor includes at least one radio receiver. The method also includes receiving or retrieving a physical location corresponding to each sensor. The physical locations define a convex hull. The method also includes determining whether an emitter signal within a target frequency range is present in any of the radio signal datasets, and assigning any radio signal dataset which comprises the emitter signal as a detection dataset. The method also includes, in response to determining three or more detection datasets, calculating a signal location based on arrival times of the emitter signal and the respective physical locations. The method also includes generating a locus of possible positions based on calculating two or more alternative signal locations. Each alternative signal location is calculated by adding synthetic noise to one or more of the detection datasets and repeating the calculations used to calculate the signal location. The method also includes, in response to the signal location is within the convex hull, applying a first cluster filter to the signal location and previously calculated signal locations within a preceding time period. The first cluster filter applies circular or spherical boundaries having a fixed radius for each of the signal location and the previously calculated signal locations. The method also includes, in response to the signal location is outside the convex hull, applying a second cluster filter to the signal location and the previously calculated signal locations within the preceding time period. The second cluster filter applies elliptical or ellipsoidal boundaries for each of the signal location and the previously calculated signal locations. Each elliptical or ellipsoidal boundary has a long axis and a short axis with length equal to the fixed radius. A ratio of the long and short axes is equal to a ratio of maximum and minimum distances spanning the respective locus of possible locations. The long axis is aligned parallel to the maximum distance. The method also includes outputting one or more estimated radio emission source locations. Each estimated radio emission source location is determined based on a respective cluster of signal locations.

The method is computer implemented. Each sensor may include two or more radio receivers. Each radio receiver may be a wide-band receiver. A wide-band receiver may correspond to a bandwidth of 20 MHz or more, 40 MHz or more, or 100 MHz or more. Each radio receiver may be a narrow-band receiver. A narrow band receiver may correspond to a bandwidth of 10 MHz or less, 5 MHz or less, or 1 MHz or less. Each sensor may include a number of radio receivers, each tuned to a different frequency range.

The signal location may be calculated using the three detection datasets corresponding to the strongest signals. The signal location may be calculated using the detection datasets which correspond to the longest baseline. The signal location may be calculated using the detection datasets which correspond to the largest area. The area corresponding to a group of three or more detection datasets may correspond to a second convex hull defined by the respective physical locations of that group of three or more detection datasets. The signal location may be calculated using all of the detection datasets.

The first and second cluster filters may include, or take the form of, nearest neighbour cluster analysis methods.

The one or more estimated radio emission source locations may be output to a display, via a message sent over a network connection, via SMS, via e-mail, by causing a speaker to output an alarm signal, and so forth.

Determining whether the emitter signal within the target frequency range is present in any of radio signal datasets may include, or take the form of, performing a correlation analysis of each radio signal dataset against each other radio signal dataset.

The correlation analysis may include, or take the form of, a sliding-window correlation analysis. The correlation may be calculated based on amplitude data. The correlation may be calculated based on complex IQ data.

The method may also include, in response to determining three detection datasets, calculating the signal location in two dimensions. When the signal location is calculated in two dimensions, the first cluster filter may apply circular boundaries and the second cluster filter may apply elliptical boundaries.

The method may also include, in response to determining four or more detection datasets, calculating the signal location in three dimensions. The signal location may be calculated using the four detection datasets corresponding to the strongest signals. The signal location may be calculated using the four detection datasets which correspond to the longest baseline. The signal location may be calculated using the detection datasets which correspond to the largest area. The area corresponding to a group of four or more detection datasets may correspond to a second convex hull defined by the respective physical locations of that group of four or more detection datasets. The signal location may be calculated using all of the detection datasets.

The signal location may only be calculated in response to determining four or more detection datasets, and the signal location may be calculated in three dimensions.

The signal location and/or any previously calculated signal locations may be projected onto a two-dimensional surface prior to application of the first and second cluster filters.

When the signal location and/or any previously calculated signal locations are projected onto a two-dimensional surface prior to application of the first and second cluster filters, the first cluster filter may apply circular boundaries and the second cluster filter may apply elliptical boundaries. The two-dimensional surface may take the form of a plane. The two-dimensional surface may take the form of a portion of a spherical surface. The two-dimensional surface may correspond to the ground, i.e. the surface of the earth, in the form of land or water or a combination, depending on the physical locations of the three of more sensors.

Adding synthetic noise to a detection dataset may include applying a temporal offset to that detection dataset. The temporal offset may be a fixed interval. To calculate an alternative signal location, at least one of the detection datasets may have the fixed interval added or subtracted, and each other detection dataset may be unchanged, may have the fixed interval added, or may have the fixed interval subtracted.

Generating the locus of possible positions may include, for each detection dataset in turn, shifting that detection dataset forwards by the fixed interval and calculating an alternative signal location, then shifting that detection dataset backwards by the fixed interval and calculating another alternative signal location, such that the total number of alternative signal locations calculated will be equal to twice the number of detection datasets.

Generating the locus of possible positions may include calculating an alternative signal location corresponding to every possible permutation (excluding doing nothing at all) of the detection datasets with a set of operations including adding the fixed interval, subtracting the fixed interval and doing nothing. When every possible permutation is calculated, the number of alternative signal locations will be three times the number of detection datasets, minus one (doing nothing for all detection datasets simply corresponds to the signal location).

Applying a temporal offset to one or more of the detection datasets may include generating, using a probability density function centred at zero offset, a different temporal offset for each of the detection datasets used to calculate the signal location. Calculating two or more alternate signal locations may include calculating a number of alternate signal locations based on generating different pseudo-random temporal offsets each time. The number of alternate signal locations generated may be 10 or more, 20 or more, 50 or more, or 100 or more.

Adding synthetic noise to a detection dataset may include generating a noise signal and adding it to that detection dataset. The noise signal may be generated according to probability density function centred at zero. The detection dataset may include a time series of signal values to which the noise signal may be added. The detection dataset may include in-phase and quadrature (IQ) values. Adding synthetic noise may include adding the same noise signal to I and Q components. Adding synthetic noise may include adding different noise signals to the I and Q components.

Calculating two or more alternate signal locations may include calculating a plurality of alternate signal locations, each time generating different pseudo-random noise values for the detection datasets. The total number of alternate signal locations generated may be 10 or more, 20 or more, 50 or more, or 100 or more.

The locus of possible positions may be generated by fitting a curve or surface to the alternative locations.

The curve or surface may be fitted so as to minimise its respective area or volume subject to the boundary enclosing the signal location and a threshold fraction of the alternative locations. The curve or surface may additionally be constrained to a particular shape. For example, the curve or surface may take the form of an elliptical or spheroidal (prolate or oblate) boundary, with degrees of freedom for the fitting corresponding to the orientation of the axes and the lengths of each axis. Alternatively, instead of fitting a particular shape, the locus of possible locations may be generated by fitting a piecewise continuous surface. The locus of possible positions may correspond to a confidence of 50% or more, 60% or more, 70% or more, 75% or more, 80% or more, 90% or more, or 95% or more. The locus of possible locations may enclose a threshold fraction of 0.5, 0.6. 0.7. 0.75, 0.8, 0.85, 0.9, 0.95, 0.98 or 0.99 of the alternative signal locations.

An estimated radio emission source location may be determined and output to correspond to each cluster of signal locations which includes more than a threshold number.

Each estimated radio emission source location may be determined as an average of a respective cluster of signal locations. The average is preferably a mean or a weighted mean. For example, each signal location in a cluster may be weighted inversely to an area or volume of the respective locus of possible locations. The average may be a median.

Each estimated radio emission source location may be determined by fitting a linear regression line to the respective cluster of signal locations, and extrapolating the linear regression line to an output time.

Additionally or alternatively, every signal location belonging to a cluster of signal locations may be output as a separate estimated radio emission source location.

The method may also include tracking clusters of signal locations across the preceding time period, such that in response to a cluster is stationary, the estimated radio emission source location is determined as an average of the signal locations belonging to that cluster, and in response to a cluster is moving, a linear regression line is fitted to the signal locations belonging to that cluster and the linear regression line is extrapolated to an output time.

Each new cluster may be initialised as stationary (a new cluster may be one having no corresponding cluster during an immediately previous iteration of the method). A stationary cluster may be changed to a moving cluster in response to a speed of the respective estimated radio emission source location exceeding a motion threshold. A moving cluster may be changed to a stationary cluster in response to a speed of the respective estimated radio emission source location being below a static threshold. The motion threshold may be equal to the static threshold, but does not need to be equal. Determination of whether a cluster is moving or stationary may be based at least on part on Doppler frequency shifts between the radio signal datasets.

The method may also include causing one or more optical telescopes and/or hardware drone countermeasures to be directed towards a corresponding estimated radio emission source location. Drone countermeasures may include one or more lasers, radio frequency jammers, global positioning system (GPS) spoofers, high power microwave devices, net launchers, interception drones and so forth.

The method may also include, based on the signal location and the previously calculated signal locations within the preceding time period, determining a bearing angle which maximises a number of signal locations within an angular threshold of the bearing angle.

The bearing angle may be calculated to originate from a centroid of the sensors. The bearing angle may originate from a user defined location within the convex hull. The bearing angle may originate from a physical location corresponding to one of the sensors, an optical telescope or a hardware drone countermeasure.

The bearing angle may be output. Output of the bearing angle may be conditional on the number of signal locations within an angular threshold of the bearing angle exceeding a threshold number. When the bearing angle is calculated to originate from a physical location of an optical telescope or a hardware drone countermeasure, the method may include orienting that telescope or hardware drone countermeasure to point along the bearing angle.

Determining the bearing angle may include calculating an angular histogram having a bin width equal to the angular threshold. The bearing angle may correspond to a central angle of an angular histogram bin containing the greatest number of signal locations. Alternatively, the bearing angle may be swept through an arc in angular increments until a peak is found. The angular increments may be smaller than the angular threshold.

The method may also include receiving or calculating an outer perimeter such that, when viewed from any position on the outer perimeter, the convex hull subtends a fixed angle. Application of the first cluster filter may be further conditional upon the signal location is within the outer perimeter. Application of the second cluster filter may be further conditional upon the signal location is within the outer perimeter.

The fixed angle for definition of the outer perimeter may be an angle between 20 and 40 degrees, more preferably 25 to 35 degrees, and most preferably between 29 and 31 degrees.

In this way, the bearing angle may always be calculated to provide at least a direction to the radio emission source. As the radio emission source moves closer and crosses the outer perimeter, cluster filtering to calculate and output an estimated radio emission source location may be carried out using the second cluster filter, in addition to the bearing angle. As the radio emission source moves closer still and crosses inside the convex hull, the first cluster filter may be applied to determining an estimated radio emission source location. Calculation of the bearing angle may be stopped when the radio emission source crosses inside the convex hull. Calculation of the bearing angle may be continued when the radio emission source crosses inside the convex hull.

According to a second aspect of the invention, there is provided a method of calculating a bearing to a radio emission source, including receiving radio signal datasets corresponding to each of three of more sensors. Each sensor includes at least one radio receiver. The method also includes receiving or retrieving a physical location corresponding to each sensor. The physical locations define a convex hull. The method also includes determining whether an emitter signal within a target frequency range is present in any of the radio signal datasets, and assigning any radio signal dataset which comprises the emitter signal as a detection dataset. The method also includes, in response to determining three or more detection datasets, calculating a signal location based on arrival times of the emitter signal and the respective physical locations. The method also includes, based on the signal location and previously calculated signal locations within a preceding time period, determining a bearing angle which maximises a number of signal locations within an angular threshold of the bearing angle. The method also includes outputting the bearing angle.

The method of the second aspect may include features corresponding to any features of the method of the first aspect. Definitions applicable to the method of the first aspect may be equally applicable to the method of the second aspect.

According to a third aspect of the invention, there is provided apparatus for passively locating a radio emission source, including a communications interface configured to receive radio signal datasets corresponding to each of three of more sensors. Each sensor includes at least one radio receiver. The communications interface is further configured to receive a physical location corresponding to each sensor, or the apparatus stores the physical locations and is configured to retrieve the physical locations. The physical locations define a convex hull. The apparatus is configured to carry out a method according to the first or second aspects of the invention.

The apparatus may include features corresponding to any feature of the method of the first aspect or the method of the second aspect. Definitions applicable to the method of the first aspect or the method of the second aspect may be equally applicable to the apparatus.

A system may include three or more sensors. Each sensor may include at least one radio receiver. Physical locations of the sensors may define a convex hull. The system also includes the apparatus, and the apparatus is configured to receive respective radio signal datasets from the three or more sensors.

The apparatus may be configured to receive radio signal datasets via wired or wireless links. The apparatus may be configured to receive radio signal datasets via a mixture of wired or wireless links between the sensors and the apparatus. For example, some sensors may be connected to the apparatus by wired links, whilst other sensors may be connected by wireless links.

Each sensor may be configured to transmit the corresponding radio signal dataset continuously. In other words, each sensor may transmits its radio signal dataset live or in "real time" with monitoring the spectrum or spectra corresponding to that sensor's radio receiver(s), or with as little delay as possible.

Each sensor may be configured to locally cache the respective radio signal dataset and to transmit the cached radio signal dataset to the apparatus in batches. Each sensor may transmit the cached radio signal dataset to the apparatus according to a predetermined schedule. Alternatively, each sensor may transmit the cached radio signal dataset to the apparatus in response to receiving a signal from the apparatus. Alternatively, each sensor may be configured to locally cache the respective radio signal dataset without transmitting it. In this case, the sensors may be intended for collection and transport to a central location for retrieval of the cached radio signal dataset.

According to a fourth aspect of the invention, there is provided a method of detecting a radio emission source, including receiving three or more radio signal datasets from three or more respective sensors. Each sensor corresponds to a physical location and includes at least one radio receiver.

The three or more radio signal datasets include one or more directional datasets obtained using a directional antenna or a directional antenna array of the corresponding sensor, and two or more omnidirectional datasets, each obtained using an omnidirectional antenna or an omnidirectional antenna array of the corresponding sensor. The method also includes determining whether an emitter signal within a target frequency range is present in any of the one or more directional datasets. The method also includes, for each directional dataset, in response to the emitter signal is present in that directional dataset, carrying out a correlation based time-of-arrival location finding calculation based on that directional dataset and at least two further radio signal datasets.

Conducting a correlation based time-of-arrival location finding calculation based on that directional dataset and at least two further radio signal datasets may include features corresponding to any or all of the features of the method according to the first aspect, the method according to the second aspect, the apparatus according to the third aspect and/or the system incorporating the apparatus according to the third aspect.

The at least two further radio signal datasets may take the form of at least two omnidirectional datasets.

For each directional dataset, in response to the emitter signal is present in that directional dataset, carrying out a correlation based time-of-arrival location finding calculation may be based on that directional dataset and all of the omnidirectional datasets of each other radio signal dataset.

For each directional dataset, in response to the emitter signal is present in that directional dataset, carrying out a correlation based time-of-arrival location finding calculation may be based on that directional dataset and all of the other radio signal datasets (directional and omnidirectional).

A radio signal dataset may be received for each of the three or more sensors. Each radio signal dataset may include a directional dataset and/or an omnidirectional dataset.

Determining whether an emitter signal within a target frequency range is present in any of the one or more directional datasets may include determining whether a signal exceeds a threshold amplitude in the time domain and/or in the frequency domain.

Additionally or alternatively, determining whether an emitter signal within a target frequency range is present in any of the one or more directional datasets may include correlating each directional dataset against a plurality of reference signal patterns. If at least one of the correlations exceeds a threshold correlation integral value, then presence of the emitter signal may be determined for that directional dataset.

The method may also include outputting a result of the correlation based time-of-arrival location finding calculation. The result of the correlation based time-of-arrival location finding calculation may take the form of one or more signal locations and/or one or more estimated radio emission source locations as described herein.

One or more of the sensors may be dual sensors which include a directional antenna or a directional antenna array, and an omnidirectional antenna or an omnidirectional antenna array.

The term "dual sensor" herein does not refer to a sensor being limited to only two antennae, and instead refers to a sensor including omnidirectional and direction capabilities. For example, an omnidirectional sensor may include one or more omnidirectional antennae and/or omnidirectional antenna arrays. Multiple omnidirectional antennae/antenna arrays may have utility, for example, by being tuned for different receiving wavelengths/frequencies.

Similarly, a directional sensor may include one or more directional antennae and/or directional antenna arrays. Multiple directional antennae/antenna arrays may have utility in two ways, for example, firstly by being oriented in different directions and/or second be being tuned for different receiving wavelengths/frequencies.

Thus, a dual sensor may include one or more omnidirectional antennae and/or omnidirectional antenna arrays and one or more directional antennae and/or directional antenna arrays.

At least one dual sensor may include a first radio receiver coupled to the directional antenna or directional antenna array, and a second radio receiver coupled to the omnidirectional antenna or omnidirectional antenna array.

A radio receiver of at least one dual sensor may be configured to be switchable between receiving inputs from the directional antenna or directional antenna array, or receiving inputs from the omnidirectional antenna or omnidirectional antenna array.

The three or more sensors may belong to one or more groups. For each group, a directional dataset may be received from one sensor belonging to that group at a time, whilst omnidirectional datasets are received from each other sensor belonging to that group. The three or more sensors may belong to a single group. The three or more sensors may belong to two or more groups. A sensor may belong to two or more groups. Sensors belonging to a group need not corresponding to adjacent or proximate physical locations.

For each group, the sensor from which the directional dataset is received may cycle through each sensor belonging to that group in a repeating sequence.

For each group, the sensor from which the directional dataset is received may be determined in dependence upon a previous result of the correlation based time-of-arrival location finding calculation.

The physical locations of the sensors may define a convex hull. Directional antennae and/or directional antenna arrays of sensors located around the perimeter of the convex hull may each be oriented to point outwards from the convex hull.

Sensors located around the perimeter of the convex hull need not include any directional antennae and/or directional antenna arrays. Sensors located around the perimeter of the convex hull may include omnidirectional antennae and/or omnidirectional antenna arrays.

Sensors located within the perimeter of the convex hull may include one or more antennae and/or antenna arrays, in any combination of directional and/or omnidirectional. When sensors located within the perimeter of the convex hull include directional antennae and/or directional antenna arrays, these may be oriented in any direction. When a sensor located within the perimeter of the convex hull includes a directional antenna and/or a directional antenna array, it may be oriented to face outwards across the closest edge of the convex hull.

In response to the emitter signal is present in a given directional dataset, the correlation based time-of-arrival location finding calculation may include receiving or retrieving a physical location corresponding to each sensor, performing a correlation analysis of the given directional dataset against each other radio signal dataset to determine whether the emitter signal is present in any of the other radio signal datasets, and assigning the given directional dataset and any other radio signal dataset which comprises the emitter signal as a detection dataset. In response to the emitter signal is present in a given directional dataset, the correlation based time-of-arrival location finding calculation may include, in response to determining three or more detection datasets, calculating a signal location based on arrival times of the emitter signal and the respective physical locations, generating a locus of possible positions based on calculating two or more alternative signal locations, each alternative signal location calculated by adding synthetic noise to one or more of the detection datasets and repeating the calculations used to calculate the signal location, in response to the signal location is within the convex hull, applying a first cluster filter to the signal location and previously calculated signal locations within a preceding time period, wherein the first cluster filter applies circular or spherical boundaries having a fixed radius for each of the signal location and the previously calculated signal locations, in response to the signal location is outside the convex hull, applying a second cluster filter to the signal location and the previously calculated signal locations within the preceding time period, wherein the second cluster filter applies elliptical or ellipsoidal boundaries for each of the signal location and the previously calculated signal locations, each elliptical or ellipsoidal boundary having a long axis and a short axis with length equal to the fixed radius, wherein a ratio of the long and short axes is equal to a ratio of maximum and minimum distances spanning the respective locus of possible locations, and the long axis is aligned parallel to the maximum distance, and outputting one or more estimated radio emission source locations, each estimated radio emission source location determined based on a respective cluster of signal locations.

When there is a directional dataset and an omnidirectional dataset for the same sensor (i.e. the radio signal dataset includes a directional dataset and an omnidirectional dataset), the correlation analysis may be performed against only the omnidirectional dataset, of may be performed against both the omnidirectional dataset and the direction dataset.

The method may also include, based on the signal location and the previously calculated signal locations within the preceding time period, determining a bearing angle which maximises a number of signal locations within an angular threshold of the bearing angle.

A border may delineate a first region from a second region. The physical locations of the sensors may all be within the first region. Directional antennae and/or directional antenna arrays of sensors may each be oriented to point towards the second region.

The directional antennae and/or directional antenna arrays of sensors may all be oriented within ±45 degrees of a reference direction. Directional antennae and/or directional antenna arrays of all sensors may be orientated within ±30 degrees, within ±25 degrees, within ±20 degrees, within ±15 degrees, or within ±10 degrees of the reference direction.

According to a fifth aspect of the invention, there is provided apparatus configured to carry out the method according to the fourth aspect.

According to a sixth aspect of the invention, there is provided apparatus for detecting a radio emission source, including a communications interface configured to receive three or more radio signal datasets from three or more respective sensors. Each sensor corresponds to a physical location and includes at least one radio receiver. The three or more radio signal datasets include one or more directional datasets obtained using a directional antenna or a directional antenna array of the corresponding sensor. The three or more radio signal datasets also include two or more omnidirectional datasets, each obtained using an omnidirectional antenna or an omnidirectional antenna array of the corresponding sensor. The apparatus is configured to determine whether an emitter signal within a target frequency range is present in any of the one or more directional datasets. The apparatus is also configured, for each directional dataset, in response to the emitter signal is present in that directional dataset, to carry out a correlation based time-of-arrival location finding calculation based on that directional dataset and at least two further radio signal datasets.

The apparatus may include features corresponding to any or all of the features of the method according to the first aspect, the method according to the second aspect, the apparatus according to the third aspect, the system incorporating the apparatus according to the third aspect, and/or the method according to the fourth aspect.

A system may include the three or more sensors, and the apparatus according to the fifth or sixth aspects, configured to receive respective radio signal datasets from the three or more sensors.

One or more of the sensors may be dual sensors which each include a directional antenna or a directional antenna array, and an omnidirectional antenna or an omnidirectional antenna array.

At least one dual sensor may include a first radio receiver coupled to the directional antenna or directional antenna array, and a second radio receiver coupled to the omnidirectional antenna or omnidirectional antenna array.

A radio receiver of at least one dual sensor may be configured to be switchable between receiving inputs from the directional antenna or directional antenna array, or receiving inputs from the omnidirectional antenna or omnidirectional antenna array.

The three or more sensors may belong to one or more groups. The system may be configured, for each group, to receive a directional dataset from one sensor belonging to that group at a time, whilst omnidirectional datasets are received from each other sensor belonging to that group. The three or more sensors may belong to a single group. The three or more sensors may belong to two or more groups. A sensor may belong to two or more groups. Sensors belonging to a group need not corresponding to adjacent or proximate physical locations.

The system may be configured, for each group, such that the sensor from which the directional dataset is received cycles through each sensor belonging to that group in a repeating sequence.

The system may be configured, for each group, such that the sensor from which the directional dataset is received is determined in dependence upon a previous result of the correlation based time-of-arrival location finding calculation.

The physical locations of the sensors may define a convex hull. Directional antennae and/or directional antenna arrays of sensors located around a perimeter of the convex hull may each be oriented to point outwards from the convex hull.

A border may delineate a first region from a second region. The physical locations of the sensors may all be within the first region. Directional antennae and/or directional antenna arrays of sensors may each be oriented to point towards the second region.

Directional antennae and/or directional antenna arrays of sensors may all be oriented within ±45 degrees of a reference direction. Directional antennae and/or directional antenna arrays of all sensors may be orientated within ±30 degrees, within ±25 degrees, within ±20 degrees, within ±15 degrees, or within ±10 degrees of the reference direction.

Each sensor may be configured to transmit the corresponding radio signal dataset continuously.

Each sensor may be configured to locally cache the respective radio signal dataset and to transmit the cached radio signal dataset to the apparatus in batches.

BRIEF DESCRIPTION OF THE DRAWINGS

Certain embodiments of the present invention will now be described, by way of example, with reference to the accompanying drawings, in which:

FIGS. 6A to 6D schematically illustrate a sliding window correlation analysis between a pair of signals;

DETAILED DESCRIPTION OF CERTAIN EMBODIMENTS

Figure 1:
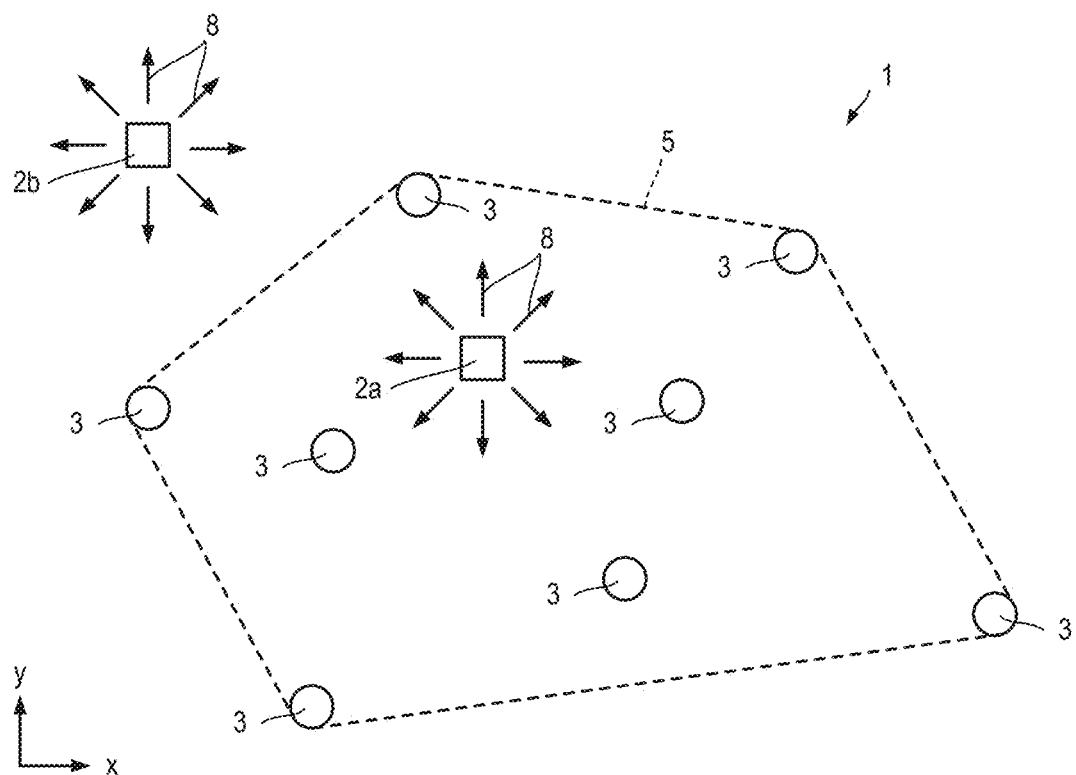
FIG. 1 is a schematic plan view of a system for radio location finding.

In the following, like parts are denoted by like reference numerals.

The present specification concerns improvements in time-of-arrival based methods for determining a location of and/or bearing to a radio emission source. In particular, the present specification concerns improvements in estimating radio emission source locations which are outside a convex hull defined by the locations of sensors (radio receivers).

The methods described herein may be applied to wide-band radio receivers, removing the need to know a transmission frequency of a radio emission source in advance.

Although often described herein in relation to detection of unauthorised radio emission sources such as drones, the methods of the present specification are equally applicable to any application/use concerning passive location of one or more radio emission sources.

Referring to FIG. 1, a system 1 for passively locating a radio emission source 2 is shown.

Figure 2:
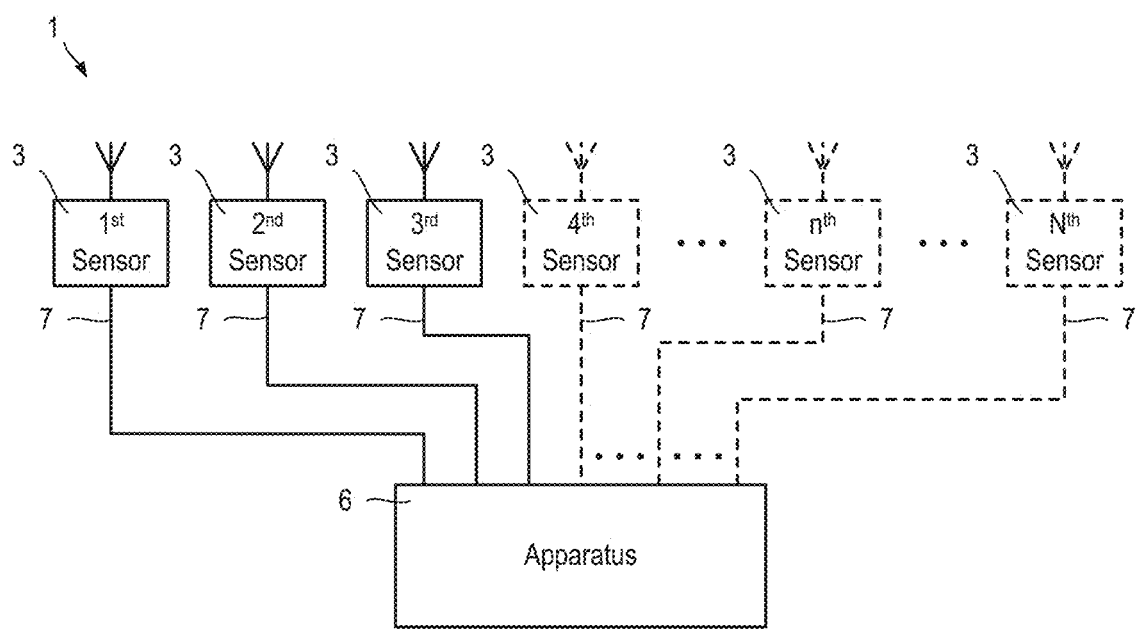
FIG. 2 is a schematic block diagram of the system shown in FIG. 1.

Referring also to FIG. 2, a block diagram of the system 1 is shown.

Figure 4:
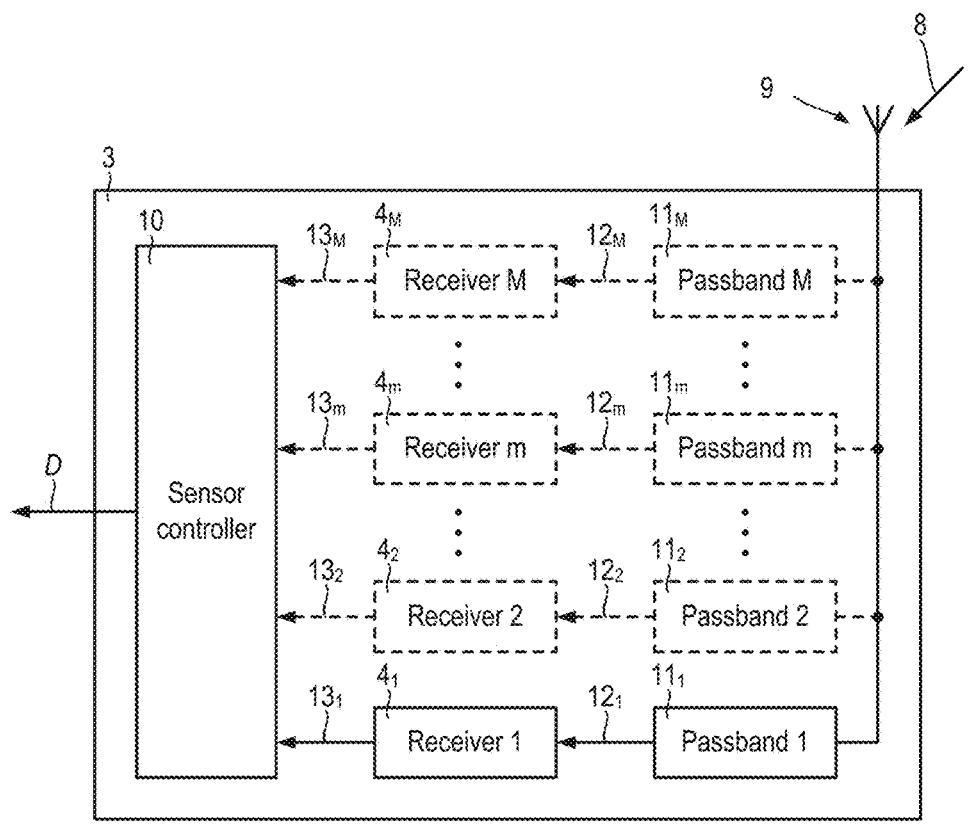
FIG. 4 is a schematic block diagram of a sensor for use in the system shown in FIG. 1.

The system 1 includes three or more sensors 3. Each sensor 3 includes (or takes the form of) at least one radio receiver 4 (FIG. 4). The sensors 3 are spread across a region, for example around and/or within the perimeter of an airport. The physical locations of each sensor 3, for example coordinates (x, y) in a local coordinate system or a latitude and longitude, are either known in advance or included in data sent from that sensor 3. The physical locations of the sensors 3 define a convex hull 5. As explained herein, the processing to estimate a location of a radio emission source 2 differs between radio emission sources 2*a* estimated to lie within the convex hull 5 and radio emission sources 2*b* estimated to lie outside the convex hull 5. There may be any number N of sensors 3 in the system 1, although the minimum number is three, i.e. N≥3.

The system 1 includes an apparatus 6 for passively locating one or more radio emission sources 2. The apparatus includes a communications interface (not shown) configured to receive radio signal datasets D (FIG. 4) corresponding to each of the sensors 3 via wired and/or wireless links 7. In some examples, the apparatus 6 may receive radio signal datasets D from the sensors 3 via a mixture of wired or wireless links 7. For example, some sensors 3 may be connected to the apparatus 6 by wired links 7, whilst other sensors 3 are connected to the apparatus 6 by wireless links 7.

If the physical locations of one or more of the sensors 3 are not stored in advance within the apparatus 6, the communications interface (not shown) of the apparatus 6 may be further configured to receive a physical location corresponding to each sensor 3. In some implementations, one or more of the sensors 3 may be mobile/moveable, and may include location sensors such as, for example, an inertial compass, a global position system (GPS) receiver and so forth. Such mobile sensors 3 may update the apparatus 6 of their present location periodically, continuously, in response to a request from the apparatus 6, by including the current physical location in the corresponding radio signal dataset D, and so forth.

The system 1 is a passive location-finding system, in the sense that it relies upon detecting radio frequency signals 8 emitted by a radio emission source 2 in order to estimate a location for that radio emission source 2. This is in contrast to an active location-finding system such as radar.

In some implementations, each sensor 3 may transmit a corresponding radio signal dataset D continuously. In other words, each sensor may transmit its radio signal dataset D live or in "real time" with monitoring the spectrum or spectra corresponding to that sensor's radio receiver(s) 4 (FIG. 4). In practice, the terms "live" and/or "real time" mean transmitting with as little delay as possible, i.e. as soon as the radio signal dataset is available with no imposed delay. Such a configuration may be applicable to a use in which there is no concern about the sensors 3 being located by another party, for example, when detecting unauthorised drones being flown into/near restricted airspace.

In other implementations, each sensor 3 may be configured to locally cache its respective radio signal dataset D, and to transmit the cached radio signal dataset to the apparatus 6 in batches. For example, according to a predetermined schedule, or in response to receiving a signal from the apparatus 6. Radio signal datasets D may be transmitted regularly, for example several times per second, or every few seconds or minutes. Alternatively, radio signal datasets D may be transmitted sporadically, for example every ten minutes, every hour, or at longer intervals.

Longer caching periods may be particularly useful when live information is not important. For example, a municipal authority may wish to determine how many drones are being flown, for how long, and over which locations, as part of routine planning. A number of battery powered sensors 3 may be distributed around a region to record radio signal datasets. The radio signal datasets may be retrieved by an operator visiting the sensors 3 with the apparatus 6 or a suitable portable device, and connecting to the sensor 3 using a wired cable, a short range wireless communication protocol such as Bluetooth® and so forth.

Another approach which uses locally cached radio signal datasets is to deploy battery powered, portable sensors 3 around an area for a duration, followed by retrieving the sensors 3 and returning to a central location for data retrieval.

Battery powered sensors 3 may be used in any example of the system 1 for which a mains connection may be difficult or impractical, whether transmission of radio signal datasets D is continuous, periodic or on demand. Battery powered sensors 3 may be rechargeable using energy harvesting devices such as solar panels, wind turbines etc.

Figure 3:
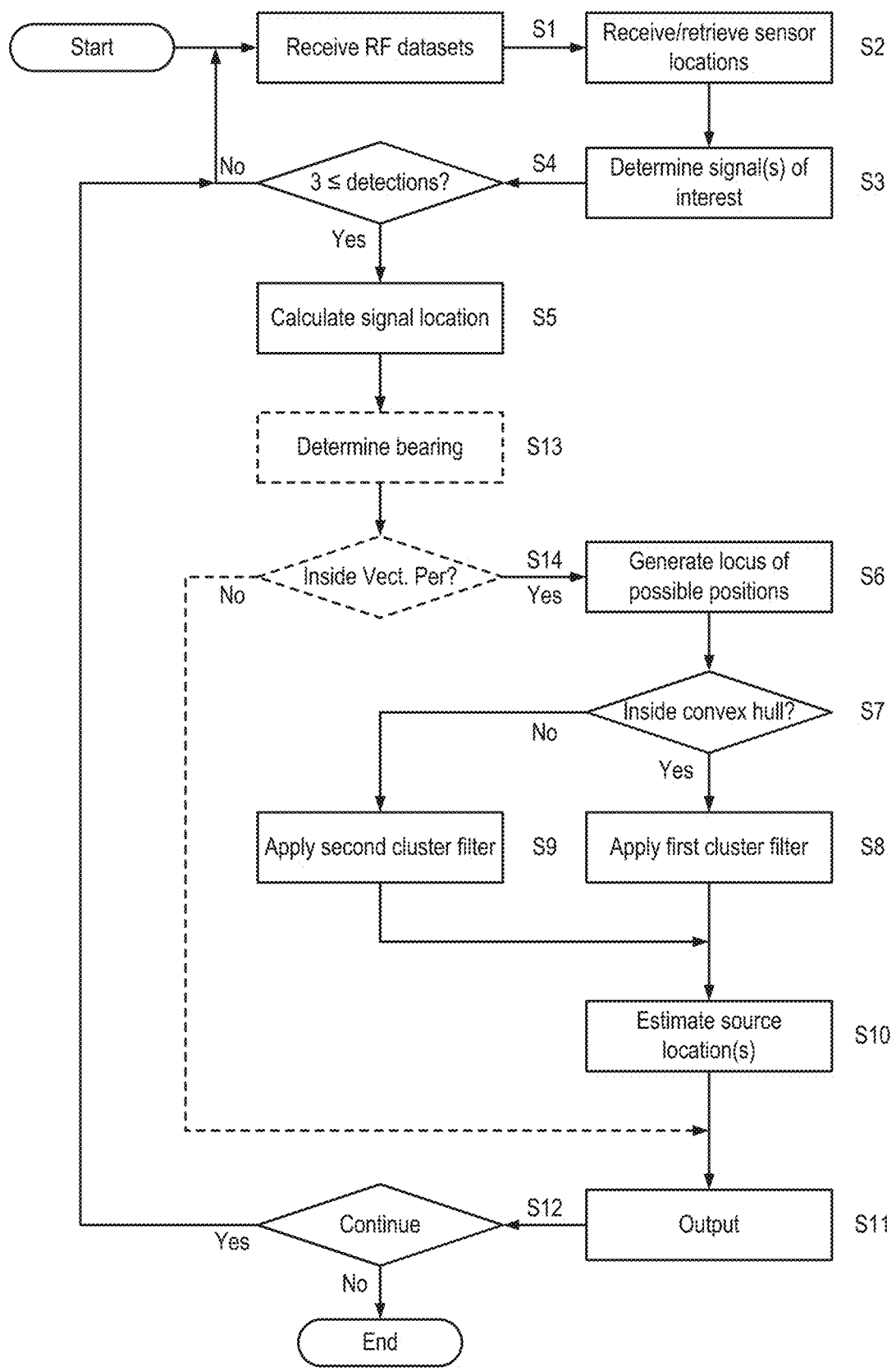
FIG. 3 is a process flow diagram of a method of radio location finding.

Referring also to FIG. 3, a process flow diagram of a method of passively locating a radio emission source 2 is shown.

The method is computer implemented, for example executed by one or more digital electronic processors of the apparatus 6. The apparatus 6 may take the form of a dedicated device, for example an application specific integrated circuit (ASIC). Alternatively, the apparatus 2 may take the form of a suitable programmed microcontroller, general purpose computer, and so forth.

Radio frequency datasets D corresponding to each of N≥3 sensors 3 are received (step S1). For convenience of reference in the following discussions, let the radio signal dataset D received from the $n^{th}$ of N sensors 3 be denoted $D_n$. The radio signal datasets $D_1, \ldots, D_n, D_N$ may take any suitable format, for example, in-phase and quadrature, I(t), Q(t) radio signal data corresponding to each radio receiver 4 (FIG. 4) of the respective sensor 3. Additionally or alternatively, radio signal datasets $D_n$ may include, or take the form of, more processed data such as power spectra corresponding to each radio receiver 4 (FIG. 4) of the respective sensor 3. In some examples, a radio signal dataset $D_n$ received in the form of raw IQ data may be augmented during this step by the apparatus 6 calculating the corresponding power spectra.

Referring also to FIG. 4, a block diagram of an exemplary sensor 3 is shown.

Figure 17:
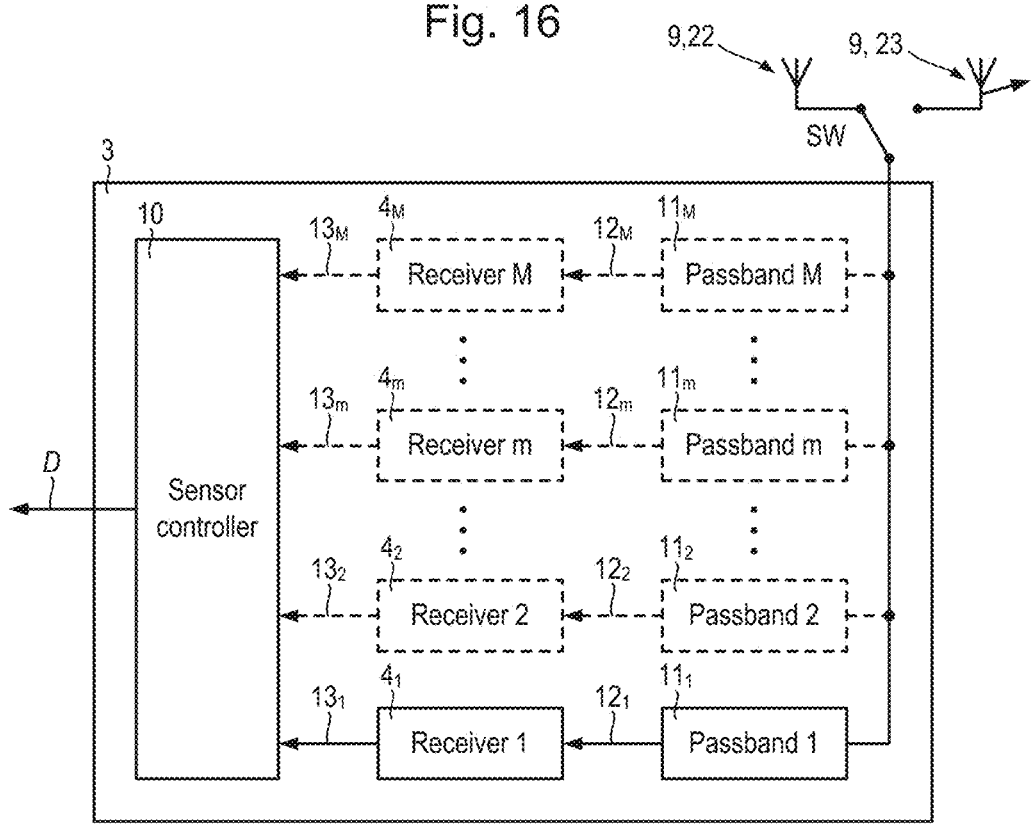
FIG. 17 is a schematic block diagram of a dual function sensor for use in the system shown in FIG. 16.

The sensor 3 includes at least one antenna 9, one or more radio receivers 4 and a controller 10 for managing and/or implementing the functions of the sensor 3. The antenna 9 may be a single antenna, or an array of antennae such as a phased array. The antenna 9 (or antennae 9) may take the form of one or more omnidirectional antennae 22 (FIG. 17), one or more directional antennae 23 (FIG. 17), or a mixture of omnidirectional antennae 22 (FIG. 17) and directional antennae 23 (FIG. 17).

Whilst only a single radio receiver $4_1$ is required, in general the sensor 3 may include any number M≥1 of radio receivers $4_1, 4_2, \ldots, 4_m, \ldots, 4_M$. Each radio receiver $4_m$ may include, or be connected to the antenna(e) 9 via, a respective passband filter $11_1, \ldots, 11_M$. In this way, each radio receiver $4_m$ may receive a different frequency range from each other receiver $4_{k \neq m}$. The frequency ranges of passband filters $11m$ may partially overlap with the frequency range(s) of one or more other passband filters $11_{k \neq m}$. Alternatively, in some implementations the frequency ranges of the passband filters $11_1, \ldots, 11_M$ may be mutually exclusive.

Radio frequency signals 8 received by the antenna(e) 9 are filtered by the one or more passband filters $11_1, \ldots, 11_M$ and corresponding passband signals $12_1, \ldots, 12_M$ are passed to the respective radio receivers $4_1, \ldots 4_M$. Each radio receiver $4_m$ measures IQ data $13_m$ and passes this to the controller 10 of the sensor 3. The controller 10 compiles the radio signal dataset D for the sensor 3, and transmits it (wired or wirelessly) to the apparatus 6.

In general, each radio receiver 4 (or the combination of radio receiver 4 and passband filter 11) may take the form of a wide-band receiver, for example having a bandwidth of 20 MHz or more, 40 MHz or more, or 100 MHz or more. Wide-band receivers may be particularly useful when the frequencies of signals 8 from radio emissions sources 2 are not known in advance. In other implementations, for example when the bandwidth of signals 8 from radio emissions sources 2 is known or predictable in advance, some or all of the radio receivers 4 may take the form of narrow-band receivers, for example each corresponding to bandwidths of 10 MHz or less, 5 MHz or less, or 1 MHz or less.

The sensor 3 shown in FIG. 4 is only one example of a suitable sensor 3 configuration. In general the system 1 may use any sensor 3 capable of detecting and recording radio signals 8.

Referring again to FIG. 3 in particular, the physical locations corresponding to each sensor 3 are received or retrieved (step S2). For example, each of N≥3 sensors 3 may correspond to a location expressed in a local coordinate system (x, y), or in terms of latitude and longitude. The physical locations of sensors 3 may also include an altitude/height of the sensor.

The method includes determining whether an emitter signal 8 within a target frequency range $f_{low} \leq f \leq f_{high}$ is present in any of the radio signal datasets $D_1, \ldots, D_N$, and any radio signal dataset $D_n$ which includes the emitter signal 8 is assigned as a detection dataset DET (step S3). The determination may be made by performing a correlation analysis amongst the radio signal datasets $D_1, \ldots, D_N$. The correlation analysis may be useful because detecting a correlation between a pair of radio signal datasets $D_n, D_{k \neq n}$ may allow determining the presence of an emitter signal 8 at a lower signal-to-noise ratio than would be required if, for example, an amplitude threshold was used to trigger the process. In other applications, where signal strength is of less concern, it may be possible to use a detection based on exceeding a threshold to trigger a correlation analysis. In general, a number 0≤J≤N of the radio signal datasets $D_1, \ldots, D_N$ may include an emitter signal 8 within the target frequency range $\{f_{low}; f_{high}\}$. Hereinafter let the $j^{th}$ of J detection datasets be denoted as $DET_j$.

The target frequency range $\{f_{low}; f_{high}\}$ may be set and/or adjusted based on user input and/or automatic analysis of power spectra corresponding to radio signal datasets $D_n$. For example, the method may include displaying power spectra corresponding to one or more of the radio signal datasets $D_1, \ldots, D_N$ to a user via a graphical user interface (GUI). In some implementations a power spectrum displayed to a user may be summed or otherwise aggregated across all of the radio signal datasets $D_1, \ldots, D_N$. The GUI may allow a user to browse the power spectrum (or spectra) in frequency and/or time, for example by allowing a user to define a frequency range and/or time period to display. The user may then set the target frequency range $\{f_{low}; f_{high}\}$ in response to spotting a signal within that frequency range. In some implementations, two or more different target frequency ranges $\{f_{low}; f_{high}\}$ may be set to permit independently estimating locations for two or more radio emission sources 2 operating in different frequency bands.

Additionally or alternatively, the target frequency range(s) $\{f_{low}; f_{high}\}$ may be set automatically based on analysis of received or calculated power spectra corresponding to the radio signal datasets $D_1, \ldots, D_N$ (as explained herein, power spectra may be part of each radio signal dataset $D_n$ or may be calculated by the apparatus 6). For example, the target frequency range $\{f_{low}; f_{high}\}$ may be set based on determining a peak in the power spectra and setting the target frequency range $\{f_{low}; f_{high}\}$ with a pre-set bandwidth and centred on that peak. Automated determination may be restricted to particular frequency bands and/or may exclude certain frequency bands. For example, if the apparatus 6 is to be used for detecting drones approaching and/or encroaching on the airspace of an airport, then automated setting of the target frequency range $\{f_{low}; f_{high}\}$ may be restricted to frequency bands typically used by commercially available drones, and/or the frequency bands used by the airport infrastructure may be excluded from automated determination of the target frequency range $\{f_{low}; f_{high}\}$.

In some implementations, an initial target frequency range $\{f_{low}; f_{high}\}$ may be automatically determined and presented to a user via the GUI, and the user may then either accept or adjust the target frequency range $\{f_{low}; f_{high}\}$ in terms of central frequency, bandwidth width and so forth.

Figure 5:
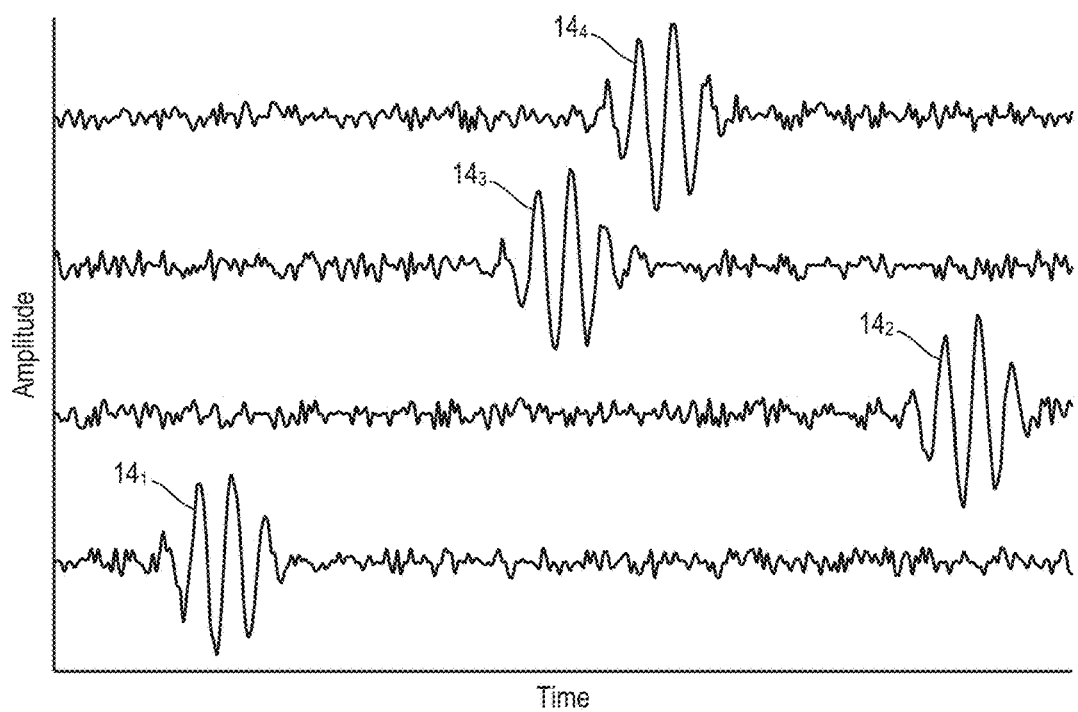
FIG. 5 schematically illustrates the same signal being received at different times by sensors at different physical locations.

Referring also to FIGS. 5 to 6D, the determination of which radio signal datasets $D_n$ are detection datasets $DET_j$ is further discussed.

FIG. 5 shows signals (for example I or Q data) as a function of time for a number N=4 of sensors 3, with the amplitudes offset relative to one another on the amplitude axis for visual clarity. The signals shown in FIG. 5 are for illustrative purposes only, and are synthetic (not measured signal data).

In this illustrative example, all four sensors 3 have captured the same signal 8, although the specific detected signal pulses $14_1, 14_2, 14_3, 14_4$ differ in that they include noise. Moreover, the signal 8 reaches each sensor 3 at a slightly different time due to varying distances between the radio emission source 2 and each sensor 3.

The radio signal 8 is detected by comparing the radio signal datasets $D_n$ against each other, for example using correlation analysis as explained hereinafter. If a strong correlation is found between any pair of signals, $14_1, \ldots, 14_4$, then a signal has been detected and the corresponding signals are assigned as detection datasets DET. A radio signal 8 detected in this way from correlation analysis may then be cross-correlated with all the remaining signals to determine whether any others beyond the initial pair captured the same radio signal 8.

Alternatively, the radio signal 8 may be detected when a pulse in one of the radio signal datasets $D_n$ exceeds a threshold, for example five times a calibrated standard error for the corresponding sensor 3. This option may be useful for strong signals by allowing the length of signals which require correlation to be reduced. However, applying a detection threshold in this way may reduce the sensitivity of detection, because correlation analysis may detect a radio signal 8 has been captured in a pair of radio signal datasets $D_n$, $D_{k \neq n}$ at a lower signal-to-noise ratio, compared to applying an amplitude threshold.

In order to determine whether the same emitter signal 8 within the target frequency range $\{f_{low}; f_{high}\}$ is commonly detected in two or more radio signal datasets $D_1, \ldots D_N$, a correlation analysis is performed to compare each radio signal dataset $D_n$ against each other radio signal dataset $D_{k \neq n}$. Generally, the entire duration of each radio signal dataset $D_n$ may be used, since it is not necessarily known in advance which if any of the radio signal datasets Dn may have captured a radio signal 8, or at what time. Alternatively, in applications were a threshold amplitude is used to obtain a positive detection, a portion of each radio signal dataset $D_n$ corresponding to a shorter window of time may be used. The first detected signal 8, whether found from correlation or from a threshold detection, is not necessarily the closest to the radio emission source 2 (for example a further sensor 3 may have a clearer line-of-sight), and consequently the apparatus 6 may also need to retrieve (also referred to as "backhauling") data from each other radio signal dataset $D_n$ for at least a period of time extending before and after the first detection.

The correlation analysis preferably takes the form of a sliding-window correlation analysis, although any other technique known for signal correlations may be used instead. The correlation analysis may be performed based on amplitude data, complex IQ data, and so forth.

For example, a correlation analysis between a pair of radio signal datasets $D_n$, $D_{k \neq n}$ may be calculated as:

$$CORR_{n,k}(\Delta t) = \int_{-\infty}^{\infty} A_n(\tau + \Delta t) A_k(\tau) d\tau \quad (1)$$

In which $A_n(t)$ is the amplitude of a signal belonging to the $n^{th}$ radio signal dataset $D_n$, $A_k(t)$ is the amplitude of the corresponding signal belonging to the $k^{th}$ radio signal dataset ($k \neq n$), $\Delta t$ is the offset in time applied to the signal $A_n(t)$, and $\tau$ is a dummy variable for the integration. The signals $A_n(t)$ and $A_k(t)$ may be normalised prior to calculating the value of the correlation integral $CORR_{n,k}(\Delta t)$. The signals $A_n(t)$ and $A_k(t)$ have finite duration and will be evaluated using numerical integration of Equation (1). An identical length segment is selected from each signal $A_n(t)$ and $A_k(t)$. Either or both signals $A_n(t)$ and $A_k(t)$ may be truncated or padded using zero-insertion prior to numerical evaluation of Equation (1).

Referring in particular to FIG. 6A, the signals $14_3$ (dashed line) and $14_4$ (solid line) shown in FIG. 5 are shown on the same axes without offsetting along the amplitude axis and for a time offset of zero ($\Delta t = 0$).

Referring in particular to FIGS. 6B and 6C, the same signal signals $14_3$ (dashed line) and $14_4$ (solid line) are shown when the signal $14_3$ for the third sensor 3 are offset by different amounts towards correspondence with the signal $14_4$ for the fourth sensor 3. It may be observed that the contribution towards a net value of the correlation integral $CORR_{n,m}(\Delta t)$ will increase when the signals $14_3$, $14_4$ are offset so as to correspond with one another.

Referring in particular to FIG. 6D, the correlation integral $CORR_{n,k}(\Delta t)$ is evaluated for a range of time offsets $\Delta t$ corresponding to the width of the sliding window. A peak in the value of the correlation integral $CORR_{n,k}(\Delta t)$ represents a likely correlation. A minimum threshold value of the correlation integral $CORR_{n,k}(\Delta t)$ may be applied to prevent false positives. In some examples, the correlation integral $CORR_{n,k}(\Delta t)$ may exhibit multiple peaks, in which case the largest peak is taken to represent the best offset $\Delta t$ value. A signal may be detected as correlated to a first detected signal even if that signal has relatively worse signal-to-noise ratio.

In addition to determining whether two or more radio signal datasets $D_1, \ldots, D_N$ include detection of the same signal 8 and may be assigned as detection datasets $DET_j$, the correlation analysis also determines the offsets $\Delta t$ between arrival times of that signal 8 at each sensor 3. These offsets $\Delta t$ are used later in the method for estimating the location of the radio emission source 2.

Referring again in particular to FIG. 3 if fewer than three detection datasets $DET_j$ are determined, i.e. J<3 (step S4|No), then no estimate of radio emission source 2 location is made, and the method proceeds to receiving subsequent radio signal datasets $D_1, \ldots, D_N$ (step S1).

However, if three or more detection datasets $DET_j$ are determined, i.e. J≥3 (step S4|Yes), then the method proceeds to calculation of a signal location r for the radio emission source 2 based on arrival times of the emitter signal 8 and the respective physical locations of the detecting sensors 3 (step S5). For example, the previously calculated offsets $\Delta t$ may be used. Estimating the signal location r of an emission source 2 based on time-of-arrival data may be carried out using any known method.

The signal location r calculated at this stage should be differentiated from an estimated radio emission source location R which is subsequently calculated (step S10) based on calculated signal locations r spanning a time period T.

If there are only J=3 detection datasets $DET_j$, then there is no choice and all three must be used to calculated a signal location r in two dimensions 9 (i.e. in a local coordinate system x-y or latitude-longitude). However, if there are J≥4 detection datasets $DET_j$, then the signal location r may be estimated in three dimensions to add an estimation of altitude/height. Whether the signal location r is calculated in two or three dimensions (using three or four detection datasets $DET_j$), if there are more detection datasets $DET_j$ then the minimum required, then a subset of the J detection datasets $DET_j$ may be used to estimate the signal location r. A subset may be chosen based on any suitable criteria including, but not limited to:

Using the subset (three or four) of detection datasets $DET_j$ corresponding to the strongest signals;

Using the subset of detection datasets $DET_j$ which correspond to the longest baseline;

Using the subset of detection datasets $DET_j$ which correspond to the largest area. The area corresponding to a group of three of more detection datasets $DET_j$ may correspond to a second convex hull defined by the respective physical locations of that group of detection datasets $DET_j$;

Using a weighted combination of the preceding factors to determine the subset to use.

Alternatively, all of the detection dataset $DET_1, \ldots, DET_J$ may be used to produce a refined estimate of the signal location r corresponding to an emission source 2.

The calculation of the signal location r in two or three dimensions may be made conditional upon the number J of detection datasets $DET_j$, for example in two dimensions when J=3, and in three dimensions when J≥4. Alternatively, the signal location r may always be calculated in two or three dimensions (three dimensions would require the minimum value of J to be set to J=4)

A locus of possible positions 15 (FIG. 8) is generated based on calculating two or more alternative signal locations p (step S6). Each alternative signal location p is calculated by adding synthetic noise to one or more of the detection datasets $DET_j$, followed by repeating the signal location calculations using the modified data.

Figure 7:
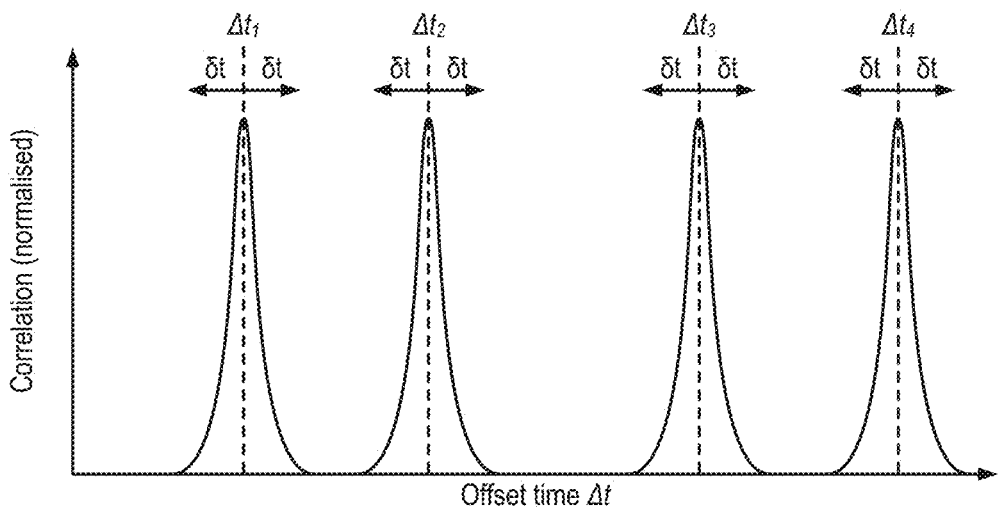
FIG. 7 schematically illustrates applying synthetic noise to a set of correlated signals to estimate the sensitivity of a calculated signal location to noise.
Figure 8:
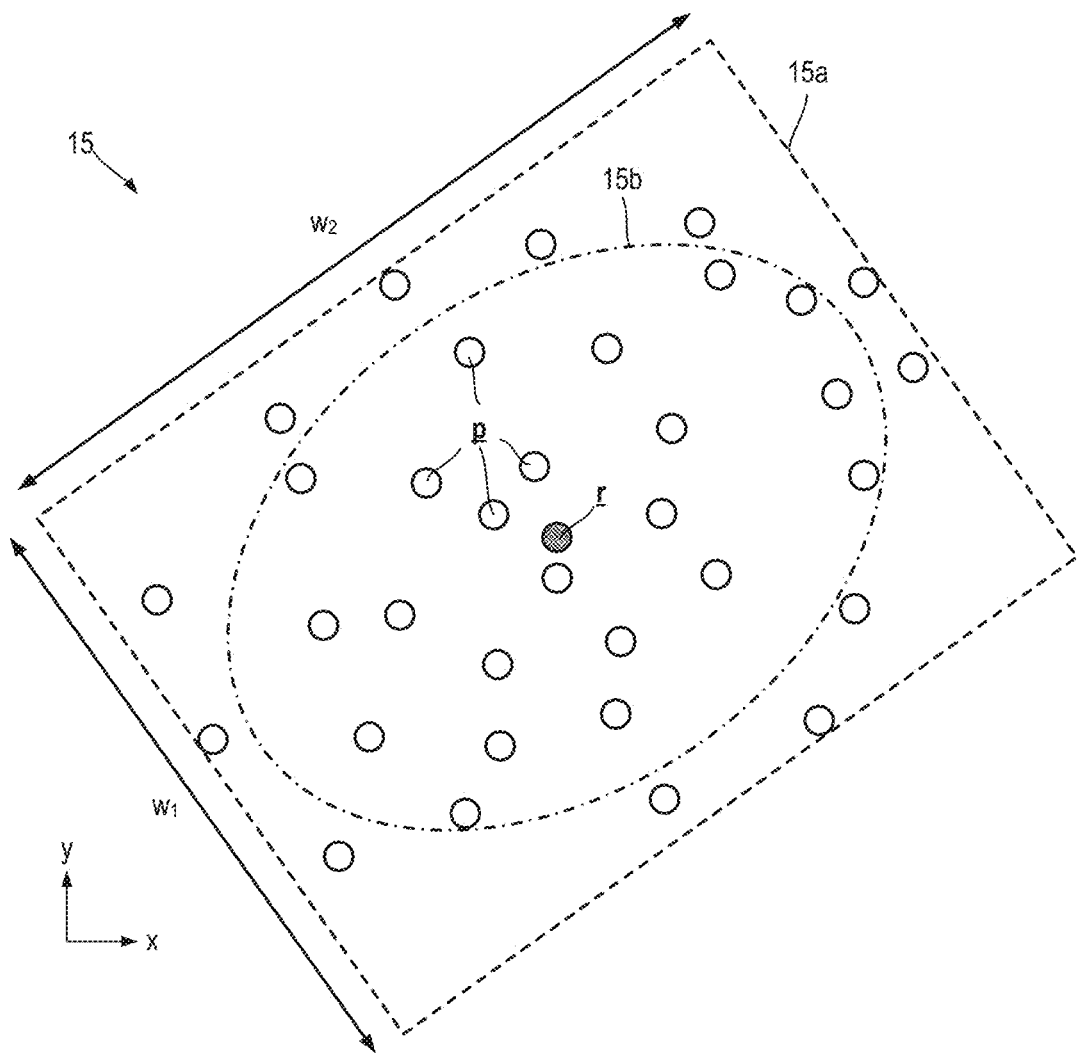
FIG. 8 schematically illustrates determining a locus of possible positions representing the sensitivity of a calculated signal location to noise.

Referring also to FIGS. 7 and 8, generation of the locus of possible positions 15 is discussed.

Referring in particular to FIG. 7, normalised correlation integral values are illustrated for a case in which there are J=5 detection datasets $DET_j$. The correlation integral values shown in FIG. 7 are synthetic for illustrative purposes.

One detection dataset $DET_j$, for the sake of illustration the fifth $DET_5$, is taken as a reference, and the time offsets $\Delta t$ are calculated relative to this reference. Offset $\Delta t_1$ is the time delay between the first $DET_1$ and fifth $DET_5$ detection datasets, offset $\Delta t_2$ is the time delay between the second $DET_2$ and fifth $DET_5$ detection datasets, and so forth.

In one example, adding synthetic noise to a detection dataset $DET_j$ may take the form of applying a temporal offset $\delta t$ to a time difference $\Delta t$ corresponding to that detection dataset $DET_j$. For example, to calculate an alternative signal location p, at least one of the detection datasets $DET_j$ may have an offset $\delta t$ added or subtracted, whilst each other detection dataset $DET_{k \neq j}$ may be unchanged, may have the offset $\delta t$ added, or may have the offset $\delta t$ subtracted. The process of calculating the signal location r is then repeated using the modified time differences $\Delta t$ to calculate an alternative position location p. For the example shown in FIG. 7, the modified time differences would correspond to $\{\Delta t_1 \pm \delta t, \Delta t_2 \pm \delta t, \Delta t_3 \pm \delta t, \Delta t_4 \pm \delta t\}$. Each temporal offset $\delta t$ may take the form of the same fixed time interval. Alternatively, in some examples each temporal offset $\delta t$ may take the form of a (pseudo) randomly interval generated using a probability density function (i.e. every temporal offset $\delta t$ value used is generated as a new, different value).

When the temporal offset $\delta t$ takes the form of a fixed interval, one option for generating the alternative signal locations p is to take each detection dataset $DET_j$ in turn, then shift the time difference $\Delta t$ for that detection dataset $DET_j$ forwards by the fixed temporal offset $\delta t$ and calculate a first alternative signal location p, followed by shifting the time difference $\Delta t$ for that detection dataset $DET_j$ backwards by the fixed temporal offset $\delta t$ and calculating a second alternative signal location p. Once repeated for each detection dataset $DET_j$, this will generate a number of 2.J alternative signal locations p.

Alternatively, the locus of possible locations 15 may be generated by calculating an alternative signal location p corresponding to every possible permutation (excluding doing nothing at all) of adding the fixed interval $\delta t$, subtracting the fixed interval $\delta t$, and doing nothing. When every possible permutation is calculated, the number of alternative signal locations p will be 3.J−1 (the minus one corresponds to the fact that doing nothing to the time differences $\Delta t$ for all detection datasets simply corresponds to the signal location r).

In a further implementation, each alterative signal location p may be generated by applying a different pseudo-random temporal offset $\delta t$ to each time difference $\Delta t$, with the temporal offsets $\delta t$ generated in accordance with a probability density function centred at zero offset. A set of alternative signal locations p may be built up by repeating this process a predetermined number of times, for example 10 or more, 20 or more, 50 or more, or 100 or more times.

An advantage of the preceding methods is that the temporal offset(s) δt are applied directly to the time differences Δt already known from the correlation analysis of step S3. In this way, a measure of the sensitivity of the signal location r calculation to noise may be obtained without the need to repeat the correlation analysis in full. Such approaches may be less computationally intensive, reducing latency and/or power consumption.

In other examples, temporal offsets δt may be generated in any way described hereinbefore, then instead applied to the raw data of the detection datasets $DET_j$, for example offsetting amplitude data and/or IQ data, followed by repetition of the correlation analysis.

Alternatively, adding synthetic noise to a detection dataset $DET_j$ may take the form of generating a noise signal (using a probability density function) and adding the generated noise signal to that detection dataset $DET_j$, for example to the amplitude data and/or IQ data. The correlation analysis may then be repeated to determine time differences Δt for the modified datasets, and a corresponding alternative signal location p calculated. This process may be repeated a number of times to build up a set of alternative signal locations n, for example 10 or more, 20 or more, 50 or more, or 100 or more times.

Once a set of at least two alternative signal locations p has been generated, the locus of possible locations 15 may be determined using the alternative signal locations p, and optionally also the calculated signal location r.

In one example, the locus of possible locations 15 may simply be assigned as the set of all the alternative signal locations p generated, optionally plus the calculated signal location r.

Another approach is to generate the locus of possible locations by fitting a curve (in two dimensions) or a surface (in three dimensions) to the alternative signal locations p (optionally plus the calculated signal location r).

For example, the locus of possible locations 15 may take the form of a curve (or surface) positioned, sized and orientated to enclose every alternative signal location p (and optionally the calculated signal location r) whilst minimising the area (or volume) within that curve (or surface). Referring in particular to FIG. 8, the rectangle 15a (dashed line) having side lengths $w_1$ and $w_2$ may be assigned as the locus of possible locations 15. The rectangle 15a may be fitted by varying the centroid, angle, and lengths $w_1$, $w_2$, to find the minimum area $w_1 \cdot w_2$ which encloses all of the alternative signal locations p.

A rectangle need not be used, and any other regular or irregular shape may be used instead. Alternatively, instead of fitting a particular shape, the locus of possible locations 15 may be generated by fitting a piecewise continuous curve or surface, or a further convex hull determined based on the alternative signal locations p.

Instead of enclosing all of the alternative signal locations p, the locus of possible locations 15 may instead be calculated as a curve (or surface) which corresponds to a particular confidence level, for example, between 50% and 95%. The curve (or surface) may be further constrained to have a particular shape, for example an ellipse (ellipsoid or oblate/prolate spheroid). Referring in particular to FIG. 8, the ellipse 15b (chained line) represents a locus of possible positions 15 in the form of a confidence boundary ellipse.

A still further alternative is to determine the locus of possible locations 15 as a curve (or surface) which encloses a threshold fraction of the alternative signal locations p, for example a fraction selected to be between 0.5 and 0.99. The curve (or surface) may be further constrained to have a particular shape, for example an ellipse (ellipsoid or oblate/prolate spheroid).

Referring again in particular to FIG. 3, following generation of the locus of possible positions 15 (step S6), it is determined whether the calculated signal location r lies inside or outside the convex hull 5 corresponding to the physical locations of the sensors (step S7). Alternatively, this determination (step S7) may be made based on whether any (or all) of the calculated signal location r and all previously calculated signal locations r within a preceding time period T are inside or outside the convex hull 5.

Figure 10:
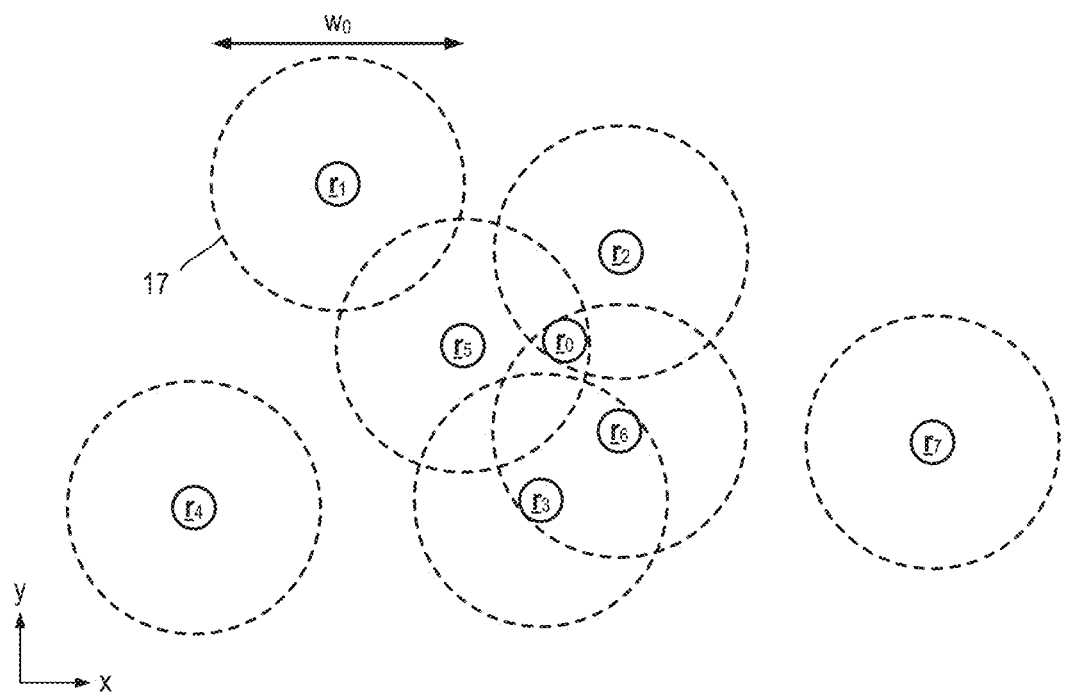
FIG. 10 schematically illustrates application of a first cluster filter.

If the calculated signal location r is within the convex hull 5 (step S7|Yes) a first cluster filter is applied to the calculated signal location r and previously calculated signal locations within a preceding time period T (step S8). The first cluster filter applies circular (or spherical) boundaries having a predetermined radius $w_0$ (FIG. 10).

If the calculated signal location r is outside the convex hull (step S7|No), a second cluster filter is applied to the calculated signal location r and the previously calculated signal locations within the preceding time period T (step S9). The second cluster filter applies elliptical (ellipsoidal or oblate/prolate spheroidal) boundaries having a short axis equal to the radius $w_0$ used for the first cluster filter, and a ratio of long and short axes which is equal to a ratio of maximum and minimum distances spanning the locus of possible positions 15. For example, the ratio would be $w_2/w_1$ with $w_1=w_0$ using the rectangular locus 15a shown in FIG. 8, or the ratio of semi-major and semi-minor axes of the elliptical locus 15b shown in FIG. 8. The long axis of each elliptical (ellipsoidal or oblate/prolate spheroidal) boundary is aligned parallel to a direction which corresponds to the maximum distance spanning the locus of possible positions 15.

The second cluster filter (step S9) may apply ellipsoidal boundaries in the form of tri-axial ellipsoids, in which case there may be a further, intermediate axis in addition to the long and short axes. When the second cluster filter (step S9) applies ellipsoidal boundaries in the form of spheroids, the long axis or the short axis may correspond to a pair of axes having equal length (oblate has a pair of equal long axes and prolate a pair of short axes).

The first and second cluster filters (steps S8, S9) preferably take the form of nearest neighbour cluster analysis methods. The first and second cluster filters (steps S8, S9) may be applied in two or three dimensions in dependence on whether the signal locations r are calculated in two or three dimensions. For simplifying calculations, or when there is a mixture of two and three dimensional calculated signal locations r, the signal location r and/or any previously calculated signal locations r may be projected onto a two-dimensional surface prior to application of the first and second cluster filters (steps S8, S9). Where the extent of coverage for the system 1 is relatively small, the two-dimensional surface for projections into two dimensions may take the form of a plane. However, when the extent of coverage of the system 1 is larger, such that the shape of the Earth cannot be neglected, the two-dimensional surface for projections into two dimensions may instead take the form of a portion of a spherical surface (e.g. corresponding to altitude at the system 1 location, sea level etc). If the information is available for the location surrounding the system 1, the two-dimensional surface for projections into two dimensions may correspond to the ground (i.e. the surface of the earth/local topographic relief), in the form of land, water or a combination.

Figure 9:
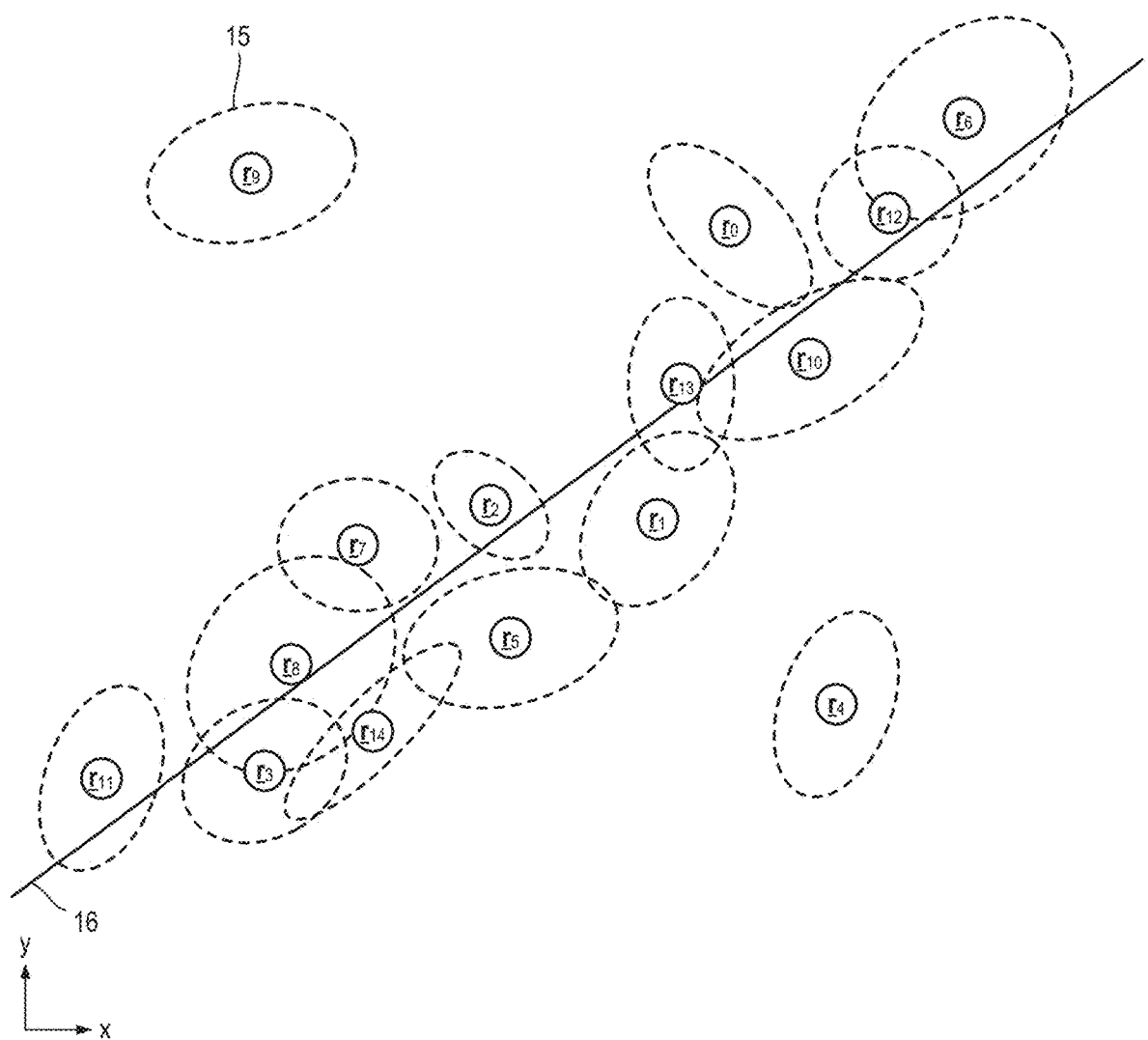
FIG. 9 schematically illustrates variability in sequentially calculated signal locations.
Figure 11:
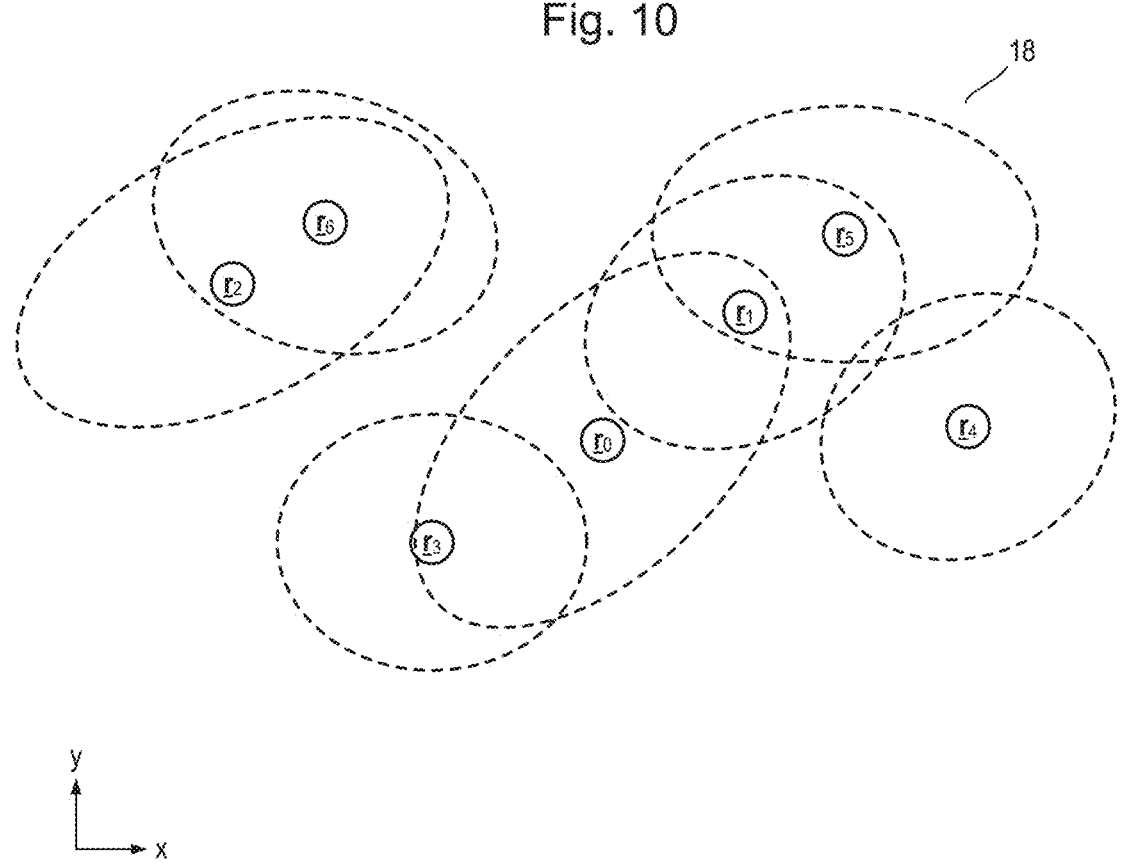
FIG. 11 schematically illustrates application of a second cluster filter.

Referring also to FIGS. 9 to 11, the cluster filtering processes (steps S8, S9) are further explained.

FIG. 9 shows a series of calculated locations r corresponding to a preceding time period.

Every time a signal location r is calculated, it is added to a buffer (or similar/equivalent data structure) which stores the present location r and all the previously calculated locations r within a given time period T Whilst signal locations r need not be calculated at regular intervals, this is expected to be common in practice. For the sake of the following explanation it will be assumed that the method of FIG. 3 is carried out at intervals of duration a, where the time period T corresponds to a number H of intervals α, i.e. T=H.α. Let the location calculated corresponding to time t−h.α be denoted as $r_h$ with h an integer 0≤h≤H (such that $r_0$ is the most recently calculated signal location). The calculated signal location r and the previously calculated signal locations within the preceding time period T would then correspond to the set $\{r_0, r_1, \ldots, r_h, \ldots r_H\}$, for example stored in a buffer for use by the cluster filtering steps (S8 or S9) of the method.

In the example shown in FIG. 9, H=15. The nature of time-of-arrival location finding calculations results in the influence of noise causing calculated locations $r_1, \ldots, r_H$ to become elongated approximately along a line 16 passing through the centroid of the set of sensors 3 used for the calculation. Although there may be little or no elongation within the convex hull 5, the further outside the convex hull 5 the true location of an emission source 2 is, the more pronounced that elongation becomes.

The example shown in FIG. 9 corresponds schematically to a set $\{r_0, r_1, \ldots, r_h, \ldots, r_H\}$ which might be observed for an emission source 2 lying outside the convex hull 5, for example emission source 2b shown in FIG. 1. The dashed ellipses shown in FIG. 9 correspond to the loci 15 of possible positions calculated for the corresponding signal locations $r_h$, in the form of confidence ellipses. The loci of possible positions 15 may be aligned along different directions for each calculated location $r_h$, for example because subset of sensors 3 used (and hence the corresponding centroid) may be different between calculations of signal location r.

In order to provide the most accurate estimation of the location R of an emission source 2, it is desirable to combine multiple calculated signal locations belonging to the set $\{r_0, r_1, \ldots, r_h, \ldots, r_H\}$. Cluster filtering is applied to screen out outliers (see for example $r_4$ and $r_9$ in FIG. 9). Within the convex hull 5, the hereinbefore described elongation along the line 16 is relatively minor (or non-existent), and cluster filtering using circular (in 2D) or spherical (in 3D) bounding surfaces may be applied. However, outside the convex hull, the inventors have observed from simulations and field trials that the elongation of calculated signal locations resulting from the combination of noise with the nature of time-of-arrival location finding (multilateration) calculations, renders conventional cluster filtering techniques less effective. Whilst the bounding surfaces for cluster filtering may be elongated to an ellipse (in 2D) or an ellipsoid (in 3D, for example a prolate spheroid), the question remains of what aspect ratio to use. The inventors have observed from simulations and field trials that using a fixed aspect ratio is not appreciably more effective than simply using a larger circle (or sphere). Instead, the inventors have determined from simulations and field trials that the accuracy of cluster filtering and locating an emission source 2 outside the convex hull 5 defined by the sensors may be improved based on the outputs of generating a locus of possible positions 15 (step S6). In particular, the second cluster filter (step S9) uses bounding surfaces having an aspect ratio which is independently set for each location $r_h$ of the set $\{r_0, r_1, \ldots, r_h, r_H\}$ to be equal to the aspect ratio of the corresponding locus $r_h$ of possible positions 15.

Referring in particular to FIG. 10, a schematic example of applying the first cluster filter (step S8) is shown.

In FIG. 10, the set $\{r_0, r_1, \ldots r_h, \ldots, r_H\}$ of the calculated signal location $r_0$ and the previously calculated signal locations $r_1, \ldots r_h, \ldots, r_H$ within the preceding time period T corresponds to H=8. The relative locations shown are schematic and intended for illustrative purposes. The dashed circles illustrate circular bounding curves 17 of fixed radius $w_0$, and for visual clarity a bounding curve 17 is not drawn for the most recently calculated signal location $r_0$.

There are two main approaches to the cluster filtering. In the first approach, for a pair of locations $r_h$, $r_{k\neq h}$ to be clustered the bounding circle 17 of one location $r_h$ must encompass or intersect the location of the other $r_{k\neq h}$ (the reverse is true by default for the first cluster filter). In the second approach, the requirement is relaxed such that a pair of locations $r_h$, $r_{k\neq h}$ are clustered if their respective bounding circles 17 overlap. In either case, more than one cluster may be determined, and locations $r_h$, $r_{k\neq h}$ which are not clustered when considered independently may become clustered via further locations.

Applying the first approach to the example shown in FIG. 10, $r_0$ is within the bounding circles 17 of each of $r_2$, $r_5$ and $r_6$ so these form a cluster. Moreover, $r_3$ is within the bounding circle 17 of $r_6$, and so is added to the overall cluster which is the set $\{r_0, r_2, r_3, r_5, r_6\}$. Each of $r_1$, $r_4$ and $r_7$ as illustrated is too far from any other location $r_h$ to form even a cluster of two.

In both the first and second cluster filters (steps S8, S9), clusters of between two and a minimum threshold number of locations $r_h$ (e.g. 5, 10 etc) may be ignored.

Applying the second approach, locations $r_4$ and $r_7$ remain outside the cluster, since the respective bounding circles 17 do not intersect those of any other locations $r_h$. However, the bounding circle 17 of the location $r_1$ intersects at least the bounding circle 17 of the location $r_5$, so that $r_1$ is also added to the cluster $\{r_0, r_1, r_2, r_3, r_5, r_6\}$.

Although in some examples clustering may be implemented such that a cluster may only grow from the most recently calculated signal location $r_0$, it is preferred that clustering be permitted to grow from any location $r_h$. This may result is determining two or more distinct clusters. If two or more clusters both exceed a minimum threshold number of locations $r_h$, this may be indicative of two distinct radio emission sources 2.

The radius $w_0$ used for a given system 1 will depend on a variety of factors including the specifics of the sensors 3, their physical locations, the local electromagnetic noise environment, and type of emission sources 2 it is desired to detect (e.g. drones, mobile telephones etc), and so forth. The radius $w_0$ may be calibrated for a specific installation using simulations and/or field trials with emission sources 2 having known locations. For example, if it is desired to use a system 1 to detect drones, one or more types of drone including location sensors (e.g. GPS, inertial compass etc) may be moved around the area of the system 1 whilst the system logs calculated locations $r_h$. The desired radius $w_0$ may then be calibrated based on a desired metric, for example, so that a false positive rate of detections does not exceed a maximum tolerance. The minimum threshold number of locations $r_h$ for a cluster to be counted may also be a variable in such a calibration.

Referring in particular to FIG. 11, a schematic example of applying the second cluster filter (step S9) is shown.

In FIG. 11, the set $\{r_0, r_1, \ldots, r_h, \ldots, r_H\}$ of the calculated signal location $r_0$ and the previously calculated signal locations $r_1, \ldots, r_h, \ldots, r_H$ within the preceding time period T corresponds to H=7. The relative locations shown are schematic and intended for illustrative purposes. The dashed ellipses illustrate elliptical bounding curves 18. Unlike for the bounding circles 17 of the first cluster filter (step S8), each elliptical bounding curve 18 is different in dependence on the locus of possible positions 15 generated for the corresponding calculated signal location $r_h$. Each elliptical bounding curve 18 has a fixed semi-minor axis of length $w_0$, equal to the radii $w_0$ of the bounding circles 17 of the first cluster filter. Each elliptical bounding curve 18 has a semi-major axis aligned parallel to a direction corresponding to the maximum dimension of the locus of possible locations 15 for the corresponding calculated signal location $r_h$. For example, if the locus 15 is a rectangle 15a, the semi-major axis of the elliptical bounding curve 18 will be parallel to the long side $w_2$, whereas if the locus 15 is an ellipse 15b, the semi-major axis of the elliptical bounding curve 18 will be parallel to the semi-major axis of the elliptical locus 15b. However, the length of the semi-major axis of each elliptical bounding curve 18 is set so that the elliptical bounding curve 18 will have an aspect ratio (of semi-major to semi-minor axes) which is equal to a ratio of maximum and minimum distances spanning the locus of possible locations 15 of the corresponding calculated signal location $r_h$.

For the 3D case, the long axis (or axes) of a spheroid are similarly aligned with the respective axis (or axes) of the locus of possible positions. If bounding surfaces take the form of tri-axial ellipsoids, then the ratio of the intermediate axis to the short axis may also be set based on a dimension of the locus 15 along a corresponding direction.

The first and second approaches to clustering (as explained in relation to the first cluster filter (step S8)) also apply to the second cluster filter (step S9). It is preferable that both first and second cluster filters (steps S8, S9) apply the same approach. It should be noted that for the second cluster filter (step S9) applying the first approach, if the bounding ellipse 18 of one location $r_h$ encompasses or intersects the location of the other $r_{k \neq h}$, the reverse is not necessarily true, but a single overlap may be sufficient for clustering. Alternatively, a third approach may apply condition of mutual overlap for clustering, i.e. such that clustering is found only if the bounding ellipse 18 of location $r_h$ encompasses or intersects the location $r_{k \neq h}$ whilst the bounding ellipse 18 of location $r_{k \neq h}$ also encompasses or intersects the location $r_h$.

Applying the first approach to the example shown in FIG. 11, a first cluster is formed by the set $\{r_0, r_1, r_3, r_5\}$ and a second cluster is formed by the set $\{r_2, r_6\}$. It may be noted that although the bounding ellipse 18 corresponding to location $r_3$ does not encompass the location $r_0$, the location is added to the first cluster $\{r_0, r_1, r_3, r_5\}$ because the bounding ellipse 18 corresponding to location $r_0$ does encompass the location $r_3$. Depending on whether a minimum number threshold is applied, the second cluster $\{r_2, r_6\}$ may be ignored. For example, if the minimum threshold was three, the first cluster would be used and the second ignored, and so forth.

Applying the second approach to the example shown in FIG. 11, the first cluster would additionally include the location $r_4$, since the corresponding bounding ellipse 18 intersects the bounding ellipses 18 of locations $r_1$ and $r_5$ (though only one is needed)

Simulations and/or experiments described hereinbefore in relation to calibrating the radius $w_0$ should preferably also include simulations/measurements where the emission source 2 having known location is both inside and outside the convex hull 5, in order to calibrate the performance of both first and second cluster filters (steps S8, S9) for a particular system 1, its environment, and intended application.

Referring again in particular to FIG. 3, one or more radio emission source location estimates R are calculated (step S10). Each radio emission source location estimate R corresponds to a different cluster determined by the first or second cluster filter (steps S8, S9). Consequently, there may be zero, one, two or more radio emission source location estimates R. For example, if a minimum threshold number of locations $r_h$ is applied to screen out small clusters, then there may be no clusters which meet or exceed that minimum threshold.

Each estimated radio emission source location R may be simply determined as an average of a respective cluster of signal locations $r_h$. For example, a first estimated radio emission source location $R_1$ may be the average of a first cluster of signal locations $r_h$ and a second estimated radio emission source location $R_2$ may be the average of a second cluster of signal locations $r_h$. The average may be of any suitable type, for example a mean or a weighted mean. For example, each signal location $r_h$ in a cluster may be weighted inversely to an area or volume of the respective locus of possible locations 15 (so that those less sensitive to noise are weighted preferentially). However, a mean average need not be used, and other measures such as a median may be used (e.g. combining a median latitude with a median longitude).

An averaging process does not take into account that an emission source 2 may well be moving during the course of the preceding period T used for clustering. An alternative approach to calculation of the estimated radio emission source location R for each cluster is to fit a linear regression line to the respective cluster of signal locations $r_h$ (using time as the independent variable), followed by extrapolating the calculated linear regression line to the output time t.

In other implementations, a hybrid of the two approaches (average and regression line) may be applied. For example, each cluster of signal locations $r_h$ may be tracked across the preceding time period T This may also help to further screen out any errors, since a cluster which is not persistent may be erroneous. When a given cluster is stationary, the corresponding estimated radio emission source location R is calculated as an average. However, when a given cluster is moving, the corresponding estimated radio emission source location R is calculated using the regression line approach.

Each new, distinct cluster which is tracked may be initialised as stationary. A new cluster may be one having no corresponding cluster during an immediately previous iteration of the method. A minimum persistence may be imposed before outputting an estimated radio emission source location R corresponding to each new cluster. A stationary cluster may be changed to a moving cluster in response to a speed of the respective estimated radio emission source location R exceeding a motion threshold. Similarly, a moving cluster may be changed to a stationary cluster in response to a speed of the respective estimated radio emission source location R being below a static threshold. The motion threshold may be equal to the static threshold, but does not need to be equal. In some implementations, it may be possible for determination of whether a cluster is moving or stationary may be based at least on part on Doppler frequency shifts between the radio signal datasets. This latter option will only be viable for some combinations of sensor 3 frequency resolution of emission source 2 velocities. In particular, sole reliance on Doppler may be inadvisable as it may miss moving emissions sources 2 moving tangentially to a radial line originating at/within the system 1.

In some examples, every signal location $r_n$ belonging to a cluster of signal locations $r_n$ may be output as a separate estimated radio emission source location R. This may be in addition to an averaged or extrapolated location R, or instead of an averaged or extrapolated location R.

Once calculated, the one or more estimated radio emission source locations R are output (step S11). For example, when the system 1 is operating live (in real time), the one or more estimated radio emission source locations R may be output to a display being monitored by a user, via a message sent to a user over a network connection, via SMS, via e-mail, by causing a speaker to output an alarm signal, and so forth. When the system 1 is not operating live, the one or more estimated radio emission source locations R may be stored to a computer readable medium (e.g. a log file) for subsequent analyses.

In addition to alerting a user, one or more hardware systems connected to the system 1 may also be activated and/or controlled in dependence on outputting at least one estimated radio emission source location R. For example, in the application of detecting drones trespassing in restricted airspace, the output step S11 may include causing one or more optical telescopes (not shown) and/or hardware drone countermeasures (not shown) to be directed towards one or more estimated radio emission source locations R. This may help to improve reaction times for positively verifying that a drone is trespassing and removing a potential threat. Drone countermeasures may include one or more known systems including without limitation lasers, radio frequency jammers, global positioning system (GPS) spoofers, high power microwave devices, net launchers, interception drones and so forth.

The method has been explained as including the generation of the locus of possible positions 15 (step S6) unconditionally, since the locus 15 provides a useful measure of sensitivity of any given calculated location $r_h$ is useful information in and of itself. However, since this information is only required for the second cluster filter (step S9), in some implementations computational overheads may be reduced by instead making the generation of the locus of possible positions 15 (step S6) conditional on the calculated signal location r ($r_0$) being outside the convex hull 5 (step S7|No).

Bearing Calculation

In addition to, or instead of, calculating zero of more estimates of radio emission source location R, the apparatus 6 may calculate a bearing angle $\theta_B$ to an emission source 2.

For example, the calculation of a bearing angle $\theta_B$ may be included at any point in the method of FIG. 3 (see step S13) following the calculation of the signal location r (step S5). In an alternative method (not specifically illustrated but including steps S1 through S5) the calculation of a bearing angle $\theta_B$ may be performed in isolation of calculating estimates of radio emission source location(s) R.

Figure 12:
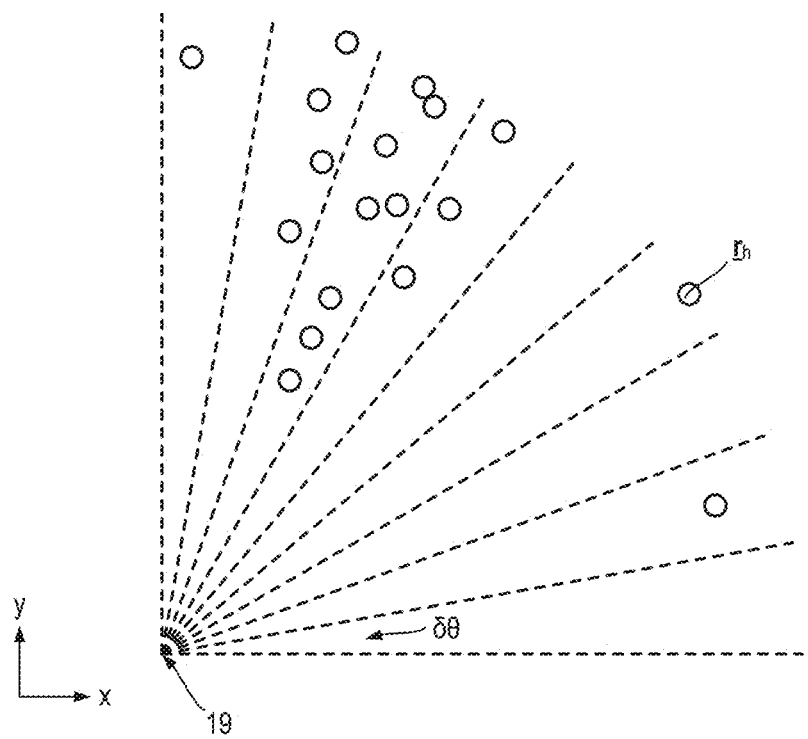
FIG. 12 schematically illustrates angular bins for determining a bearing angle.
Figure 13:
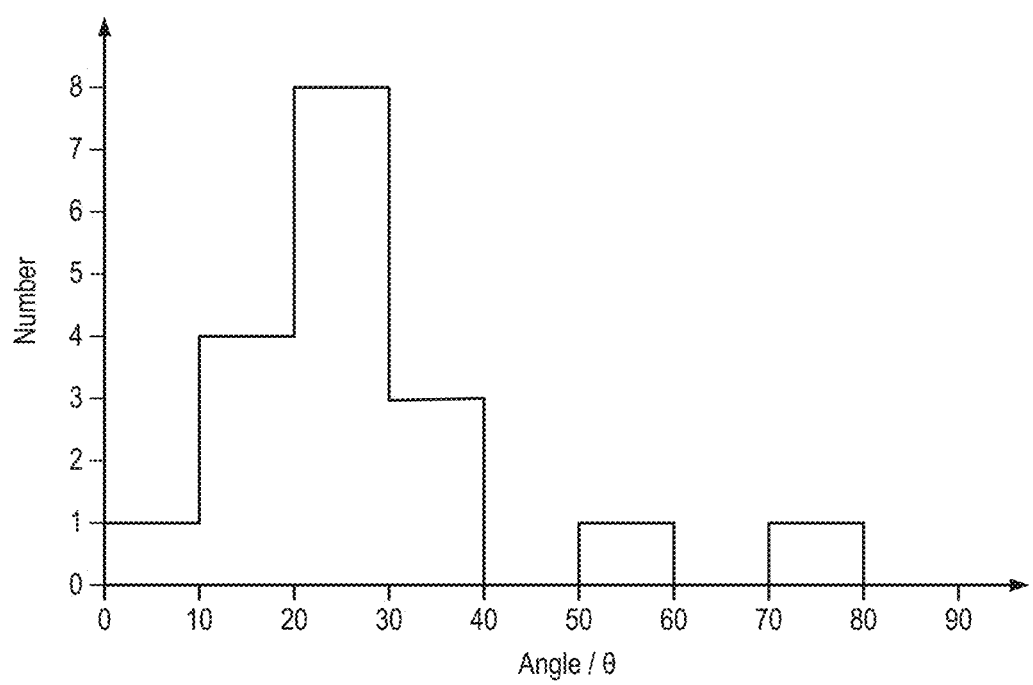
FIG. 13 is a histogram corresponding to FIG. 12.

Referring also to FIGS. 12 and 13, calculation of a bearing angle $\theta_B$ is further described.

The calculation is performed based on the signal location r and the previously calculated signal locations r within the preceding time period T, i.e. the same set of signal locations r used for the cluster analyses (step S8 or S9). For the sake of explanations, again assume that the signal locations r are calculated at regular intervals so that this set is $\{r_0, r_1, \ldots, r_h, \ldots, r_H\}$ as defined hereinbefore.

The bearing angle $\theta_B$ is determined as the angle $\theta$ which maximises a number of signal locations $r_h$ within an angular threshold $\delta\theta$ of the bearing angle $\theta_B$.

Referring in particular to FIG. 12, a number H=18 of signal locations r are illustrated, with dashed lines delineating fixed angular intervals of $\delta\theta=10°$ fanning out from an origin point 19.

Referring in particular to FIG. 13, determining the bearing angle $\theta_B$ may include calculating an angular histogram having a bin width equal to the angular threshold $\delta\theta$. The bearing angle $\theta_B$ is then determined as a central angle of an angular histogram bin containing the greatest number of signal locations $r_h$. In the example shown in FIGS. 12 and 13, the bearing angle is $\theta_B=25°$ from the y-axis as illustrated, because the angular bin between 20° and 30° contains the largest number (eight) of signal locations $r_h$. A minimum threshold may be applied to the number of locations $r_h$ within the angular bin before a peak is counted and used for determining a corresponding bearing angle $\theta_B$. If there are additional, distinct peaks in the angular histogram, each distinct peak may be assigned a corresponding bearing angle $\theta_B$. This may occur when there are two or more emission sources 2 active at the same time.

Alternatively, the angle $\theta$ may be swept through an arc (up to $2\pi/360°$) in angular increments smaller than a desired angular threshold $\delta\theta$ (e.g. increments of $\delta\theta|10$), counting the number of signal locations $r_h$ in the range $\theta-\delta\theta<\theta\leq\theta+\delta\theta$, until one or more peaks is found and assigned as the bearing angle $\theta$. As with the angular histogram method, a minimum threshold number of locations $r_h$ may be imposed, and in some cases multiple peaks may exceed the minimum threshold and consequently be treated as separate bearing angles $\theta_B$.

If calculated, one or more bearing angles $\theta_B$ may be output along with (or instead of) the estimated radio emission source location(s) R (step S11), in any way described hereinbefore.

Calculation of a bearing angle $\theta_B$ requires definition of an origin point 19. In general, the bearing angle $\theta_B$ may be calculated to originate from an origin point 19 corresponding to a centroid of the sensors 3 of the system 1.

Alternatively, the origin point 19 may be set and/or modified to correspond to a user defined location within the convex hull 5. In some implementations, the bearing angles $\theta_B$ may be calculated from an origin point 19 corresponding to one of the sensors 3, or to an optical telescope (not shown) or a hardware drone countermeasure (not shown). Such an optical telescope and/or drone countermeasure may also be caused to point along the output bearing angle $\theta_B$.

An extension of the method of calculating a bearing angle $\theta_B$ may be implemented. In a first step, a peak in an angular histogram or angular sweep may be determined as hereinbefore described from an arbitrary origin (e.g. the centroid of the sensors 3). In a second step, a linear regression may be applied to the locations $r_h$ corresponding to that (or each) peak, to obtain a unique bearing angle. An origination point may be set to any position along the unique bearing angle, and may be chosen for convenience in a given application. For example, the location of an optical telescope or drone countermeasure when the system is used to detect unauthorised drones in an airspace.

Outer Perimeter

The determination of one or more bearing angles $\theta_B$ (step S13) may maintain reliability out to a larger distance from the convex hull 5 than the determination of one or more estimated radio emission source locations R (steps S6 through S10).

Consequently, in an implementation of the method of FIG. 3 which includes the optional step of determining a bearing angle $\theta_B$ (step S13), computational overheads may be reduced and false positives also reduced by omitting the determination of estimated radio emission source location(s) R (steps S6 through S10) if the calculated signal location r is far enough from the system 1.

For example, the method may bypass the determination of one or more estimated radio emission source location R (steps S6 through S10) in response to the calculated signal location r is outside an outer perimeter 20 (FIG. 14) (step S14|No). The outer perimeter 20 is an outer perimeter in the sense that for a signal location r calculated as being outside this perimeter 20, estimates of radio emission source location(s) R are not made.

Figure 14:
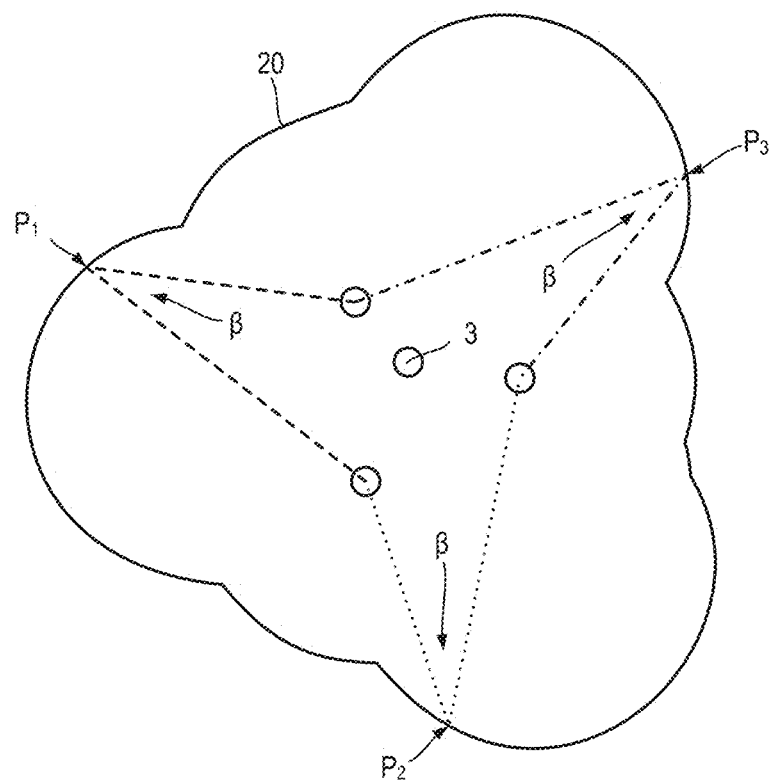
FIG. 14 schematically illustrates the definition of an outer perimeter for an arrangement of sensors.

Referring also to FIG. 14, an outer perimeter 20 is illustrated corresponding to an exemplary system 1 including four sensors 3.

The outer perimeter 20 corresponds to the locus of positions on which the sensors 3 (and corresponding convex hull 5) subtend a constant angle β. In the example shown in FIG. 14, the illustrated outer perimeter 20 corresponds to an angle of β=30°, which in simulations and field trials the inventors have found to be a suitable angle in many real applications. Three points $P_1$, $P_2$, $P_3$ are highlighted around the outer perimeter 20 to illustrate that the angle β subtended by the sensors 3 from any point is fixed.

Figure 15:
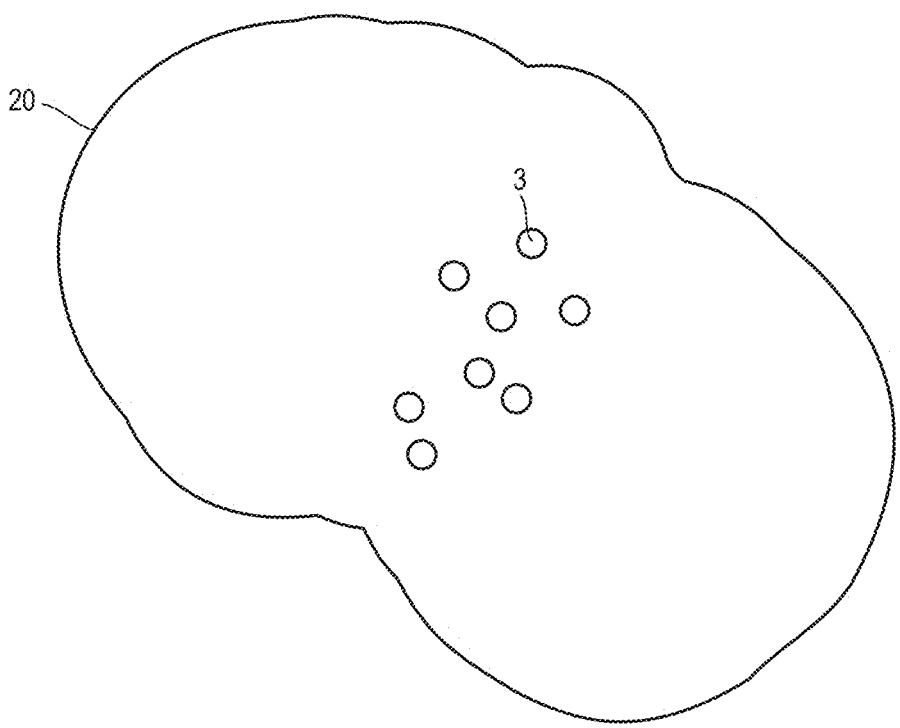
FIG. 15 schematically illustrates the definition of an outer perimeter for a different arrangement of sensors to that shown in FIG. 14.

Referring also to FIG. 15, another outer perimeter 20 is illustrated corresponding to an exemplary system 1 including eight sensors 3, corresponding to a fixed angle of β=30°.

Although the examples of outer perimeter 20 correspond to the same fixed angle of β=30°, the angle β may be varied. For example, for a system 1 intended to detect objects such as drones in and around a protected airspace, the outer perimeter 20 used may correspond to an angle β of between (and including) 20° and 40°. Equally, alternative methods of defining the outer perimeter 20 may be used, for example, the outer perimeter 20 may be defined as a locus of points a fixed distance from the convex hull 5.

In this way, bearing angles $\theta_B$ may be determined regardless of range (step S13), the first cluster filter may be applied (step S8) in response to the calculated signal location r is within the convex hull 5 (step S7|Yes) and within the outer perimeter 20 (step S14|Yes) (the latter condition being always true if the former is true), and the second cluster filter may be applied (step S9) in response to the calculated signal location r is outside the convex hull 5 (step S7|No) and within the outer perimeter 20 (step S14|Yes).

In this way, a bearing angle may $\theta_B$ always be calculated to provide at least a direction to a radio emission source 2. As the radio emission source 2 moves closer and crosses the outer perimeter 20, cluster filtering to calculate and output an estimated radio emission source location R will be carried out using the second cluster filter (step S9), in addition to the bearing angle $\theta_B$. As the radio emission source 2 moves closer still and crosses inside the convex hull 5, the first cluster filter (step S8) will be applied to determining an estimated radio emission source location R. Although it is possible to continue calculating the bearing angle $\theta_B$ for radio emission sources 2 within the convex hull 5, the availability of a more accurate estimated radio emission source location R at such ranges means that calculation of the bearing angle $\theta_B$ may be of reduced value, and may be omitted for radio emission sources 2 within the convex hull 5.

Modifications

It will be appreciated that various modifications may be made to the embodiments hereinbefore described. Such modifications may involve equivalent and other features which are already known in the design and use of methods and apparatuses for radio location finding based on times-of-arrival, and which may be used instead of or in addition to features already described herein. Features of one embodiment may be replaced or supplemented by features of another embodiment.

Although three particular approaches to cluster filtering have been described, any approaches using the same bounding curves (or surfaces) may be used.

System for Signal Detection and Location Using Directional Antennae

As described hereinbefore, the method of passively locating a radio emission source 2 (see FIG. 3) generally uses a correlation analysis amongst the radio signal datasets $D_1, \ldots, D_N$ to detect the presence of signals. This approach may function for lower signal levels than, for example, an amplitude threshold (in time or frequency domains).

It has also been described hereinbefore that the antenna 9 (which may be a single antenna or an array, e.g. a phased array) may take the form of one or more omnidirectional antennae 22 (FIG. 17), one or more directional antennae 23 (FIG. 17), or a mixture of omnidirectional antennae 22 (FIG. 17) and directional antennae 23 (FIG. 17).

A radio direction finding system 1 which includes directional antennae 23 (FIG. 17), or arrays thereof, in at least some sensors 3, may utilise a signal detection method based on mixing signals from directional and omnidirectional antennae 9, 22, 23 (FIG. 17) to increase a range at which a radio emission source 2 may be detected.

Figure 16:
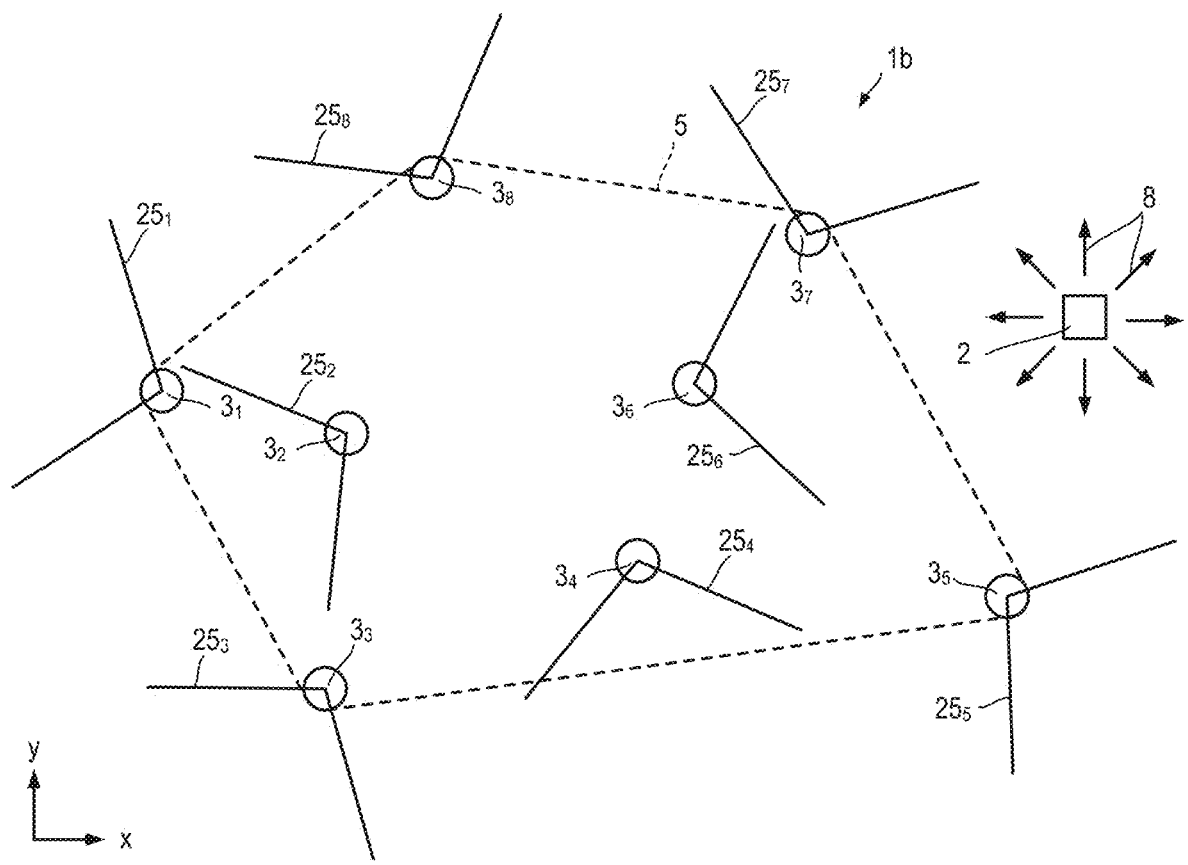
FIG. 16 is a schematic plan view of a second system for radio location finding

Referring also to FIG. 16, a second system 1*b* is shown. Referring also to FIG. 17, an example of a sensor 3 including both directional and omnidirectional antennae 9, 22, 23 is shown, hereinafter referred to as a dual-function, "dual", sensor 3. The term "dual sensor" herein does not refer to a sensor 3 being limited to only two antennae 9, and instead refers to a sensor 3 including omnidirectional 22 and directional 23 antennae 9 (or antenna arrays).

For example, an omnidirectional sensor 3 may include one or more omnidirectional antennae 22 (and/or arrays thereof). Multiple omnidirectional antennae 22 (or arrays) in a single sensor 3 may have utility, for example, by being tuned for different receiving wavelengths/frequencies. Similarly, a directional sensor 3 may include one or more directional antennae 23 (and/or arrays thereof). Multiple directional antennae 23 (or arrays) in a single sensor 3 may have utility in at least two ways. Firstly by being oriented in different directions and/or secondly by being tuned for different receiving wavelengths/frequencies.

Therefore, a dual sensor 3 may include one or more omnidirectional antennae 22 (or arrays) and one or more directional antennae 23 (or arrays), with multiples of either option providing the effects described hereinbefore.

Referring in particular to FIG. 17, in some implementations, each radio receiver $4_1, \ldots, 4_M$ of the sensor 3 is configured to be switchable between receiving inputs from a directional antenna 23 (or an array thereof), or receiving inputs from an omnidirectional antenna 22 (and an array thereof). In the example shown in FIG. 17, a single, global switch SW may connect a common input to the one or more passbands $11_1, \ldots, 11_M$ to either the directional antenna 23 or the omnidirectional antenna 22, and the sensor 3 is otherwise configured in any way described hereinbefore (see FIG. 4).

In an alternative implementation, each sensor 3 may include separate radio receivers 4 for signals from directional 23 and omnidirectional 22 antennae (or arrays thereof), to allow receiving both types of data simultaneously. For example, a group of receivers $4_1, \ldots, 4_k$ may be connected to an omnidirectional antenna 22, whilst the remainder $4_{k+1}, \ldots, 4_M$ are connected to a directional antenna 23. In such a configuration, it is preferable that the same passband(s) are applied to both direction and omnidirectional channels (by separate filters 11 having the same frequency ranges).

Each directional antenna 23 has respective radiation pattern 25 having a main lobe which may be oriented either upon installing/placing/moving the sensor 3 (for a fixed configuration of antenna conductors) or dynamically (e.g. if directional antenna 23 is a phased array). Orientations of radiation patterns 25 are shown schematically in FIG. 16 using angled lines expanding in the direction of maximum sensitivity.

When the physical locations of the sensors 3 define a convex hull 5, as in the second system 1b shown in FIG. 16, directional antennae 23 of sensors 3 located around the perimeter of the convex hull 5 may be oriented to point outwards from the convex hull 5.

When sensors 3 located within the perimeter of the convex hull 5 include directional antennae 23, these may be oriented in any direction, but preferably are oriented to face outwards across the closest edge of the convex hull 5 and/or to cover any gaps in the coverage provided by directional antennae 23 of sensors 3 located on (defining) the convex hull 5.

Although the second system 1b is illustrated with every sensor 3 as a dual sensor, this is not required for the signal detection method described hereinafter. In general a sensor 3 located around the perimeter of the convex hull 5 need not include any directional antennae 23 (or arrays thereof), and may include one or more antennae 9 (or antenna arrays), in any combination of directional 23 and/or omnidirectional 22. Similarly, sensors located within the perimeter of the convex hull may include one or more antennae 9 (or antenna arrays), in any combination of directional 23 and/or omnidirectional 22.

For the method of signal detection and location described hereinafter, the minimum requirements on the sensors 3 are that at least one sensor 3 includes a directional antenna 23, whilst at least two further sensors 3 (at different physical locations) include omnidirectional antennae 22.

Figure 18:
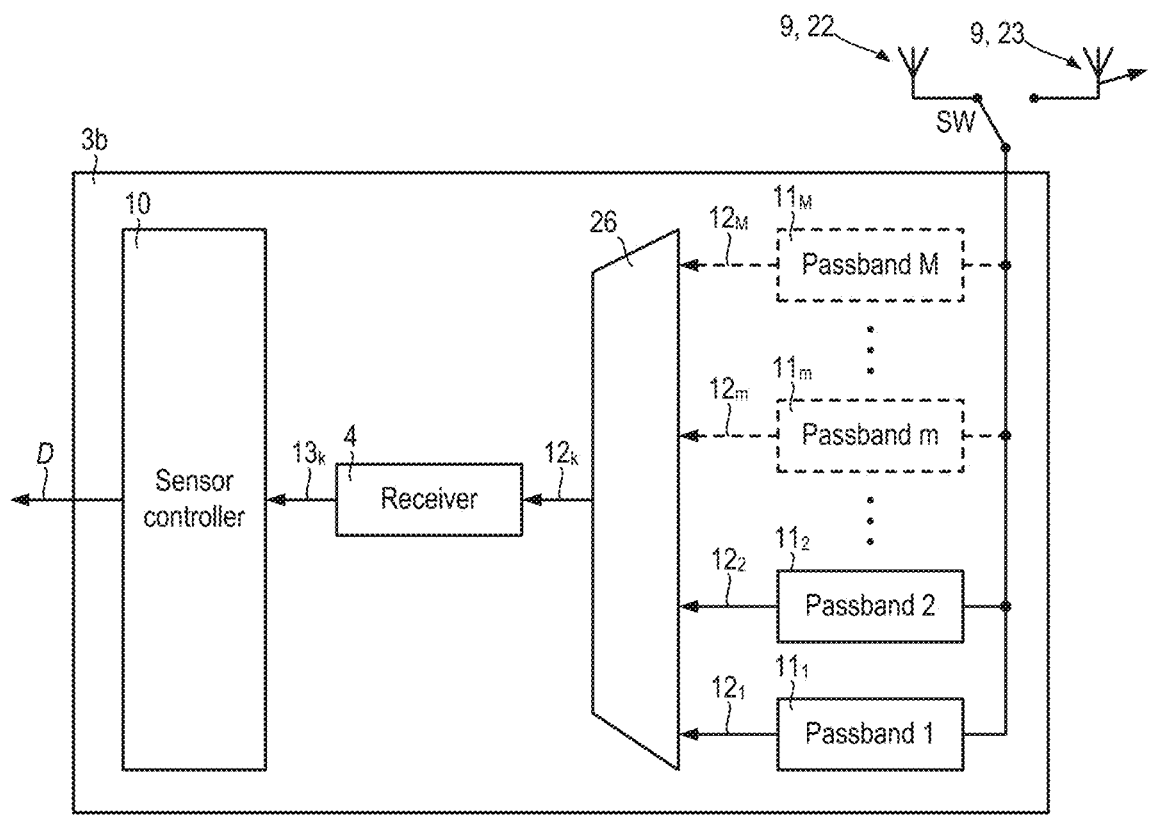
FIG. 18 is a schematic block diagram of a frequency selecting sensor for use in the system shown in FIG. 16.

Referring also to FIG. 18, a frequency selecting sensor 3b is shown.

The frequency selecting sensor 3b is the same as the sensor 3 described with reference to FIG. 17, except that the frequency selecting sensor 3b only includes one receiver 4, and two or more passbands $11_1, 11_2, \ldots, 11_M$. In use, the frequency selecting sensor 3b samples one passband $11_1, 11_2, \ldots, 11_M$ at a time using multiplexer 26 (or analogous switch or switching network), according to a predetermined schedule, or according to instructions received from the sensor controller 10 and/or the apparatus 6. Alternatively, a frequency selecting sensor 3b may include additional receivers, each connected to two or more passbands by a respective multiplexer 26 (or analogous switch or switching network). For example, a first receiver 4 may select a passband band for monitoring an omnidirectional antenna 22 (or array), whilst a second receiver 4 may independently select a passband (which may be the same or different) for monitoring a directional antenna 23 (or array).

In the second system 1b, each sensor 3 may be configured to transmit the corresponding radio signal dataset D to the apparatus 6 continuously or in real time, in any way explained hereinbefore in relation to the system 1. Alternatively, each sensor 3 of the second system 1b may be configured to locally cache the respective radio signal dataset and to transmit the cached radio signal dataset to the apparatus 6 in batches, in any way explained hereinbefore in relation to the system 1.

Method for Signal Detection and Location Using Directional Antennae

Radio frequency datasets $D_n$ corresponding to each of $N \geq 3$ sensors 3 are received, for example using the communication interface (not shown) of the apparatus 6. The reception of three of more radio signal datasets $D_1, \ldots, D_N$ is the same as the corresponding step (S1) of the method illustrated in FIG. 3 and described hereinbefore, except that there is an additional constraint that the three or more radio signal datasets should include:

one or more directional datasets DIR obtained using a directional antenna 23 (or a directional antenna array) of the corresponding sensor 3; and two or more omnidirectional datasets OMNI, each obtained using an omnidirectional antenna or an omnidirectional antenna array of the corresponding sensor.

A radio signal dataset D may be received for every sensor 3, or for a subset of as few as three sensors 3. Each radio signal dataset D, for example the $n^{th}$ $D_n$, may include one or more directional datasets $DIR_n$ and/or one or more omnidirectional datasets $OMNI_n$.

The apparatus determines whether an emitter signal 8 within a target frequency range $\{f_{low}; f_{high}\}$ is present in any of the one or more directional datasets $DIR_n$. Unlike the corresponding step (S3) of the method shown in FIG. 3, the determination is made based on each directional dataset $DIR_n$ when considered alone. Using a directional antenna 23, the signal to noise ratio for an emitter signal 8 originating in the direction the directional antenna 23 is pointed may be greatly improved. Any suitable method for detecting the presence of a radio signal may be applied to each individual directional dataset $DIR_n$. For example, determining whether an emitter signal 2 is present may include detecting a signal in the directional dataset DIR which exceeds a threshold amplitude in the time domain and/or in the frequency domain.

Additionally or alternatively, determining whether an emitter signal 2 is present in a directional dataset $DIR_n$ may include correlating that directional dataset $DIR_n$ against a number (or library) of reference signal patterns. If at least one of the correlations exceeds a threshold correlation integral value, then presence of the emitter signal 8 is determined.

In response to the emitter signal 8 is determined to be present in at least one directional dataset $DIR_n$, the apparatus 6 is configured to carrying out a correlation based time-of-arrival location finding calculation based on all of the radio signal datasets D. In other words, the correlation based time-of-arrival location finding calculation includes, in addition to a directional dataset $DIR_n$ in which the emitter signal 8 was detected, each other directional dataset $DIR_{k \neq n}$ and every omnidirectional dataset $OMNI_1, \ldots, OMNI_N$ included in the received radio signal datasets $D_1, \ldots, D_N$.

Alternatively, when the radio dataset for a given sensor 3 includes one or more directional datasets and one or more omnidirectional datasets, the correlation analysis may be performed against only the omnidirectional dataset(s). At minimum, two other radio signal datasets D must be used, which may be directional DIR (e.g. if there is overlap) and/or omnidirectional OMNI.

In this way, a more sensitive directional antenna 23 may be used to trigger a correlation analysis. Although the signal to noise ratio in the omnidirectional datasets $OMNI_1, \ldots, OMNI_N$ will typically be lower, correlation analysis has a high noise tolerance compared to other signal detected methods, and with the signal from a directional dataset $DIR_n$ to correlate against, the emitter signal 8 may be found (if present) in the omnidirectional datasets $OMNI_1, \ldots, OMNI_N$. Additionally, because the arrival time at the sensor 3 corresponding to the directional dataset DIR is known, and the maximum delay time can be calculated based on the known sensor 3 locations, the length of a time window used for correlated against each other directional dataset $DIR_{k \neq n}$ and/or omnidirectional dataset $OMNI_1, \ldots, OMNI_N$ can be made shorter than for a blind correlation (where the entire length of each dataset must be tried against the entire length of each other). Reducing the duration of the correlation window may also help to reduce the possibility of false correlations which may arise when long windows are used. For example, in the directional dataset $DIR_n$, the start and duration of the detected emitter signal 8 is known, enabling the data before and after the detected emitter signal 8 to be omitted or zeroed so that any other signals captured just before or after the detected emitter signal 8, will not be accidentally correlated against with the other datasets D. Moreover, using directional antennae 23 permits triggering such an analysis based on a positive detection of an emitter signal 8 out to a greater range than would be possible using only omnidirectional datasets $OMNI_n$.

The correlation based time-of-arrival location finding calculation may be performed in accordance with the method shown in FIG. 3 (steps S4 onwards) and any variations thereof described hereinbefore. Thus, the result of the correlation based time-of-arrival location finding calculation may take the form of one or more signal locations r and/or one or more estimated radio emission source locations R as described herein.

Alternatively, the determination of the emitter signal 8 in at least one directional dataset $DIR_n$ may be used to trigger any suitable correlation based time-of-arrival location finding calculation.

The method may also include outputting a result of the correlation based time-of-arrival location finding calculation, for example using any method described herein in relation to the outputs of method shown in FIG. 3 (step S11). Additionally, the output of the result of the correlation based time-of-arrival location finding calculation may include, or take the form of, activating and/or controlling one or more hardware systems connected to the second system 1b. The hardware systems may be any described hereinbefore.

Directional Scanning

In some implementations, a radio receiver 4 may be coupled to each directional antenna 23 continuously for monitoring. For example, in the second system 1b illustrated in FIG. 16 implemented with sensors $3_1, \ldots, 3_8$ which have concurrent monitoring of omnidirectional 22 and directional 23 antennae (or arrays), for example using at least a pair of radio receivers 4. In this way, the orientations of the directional antennae 23 of the sensors 3, which all face outwards, may provide coverage to detect an unauthorised radio emission source 2 approaching from any direction.

In other implementations, for example when the sensors $3_1, \ldots, 3_8$ of the second system illustrated in FIG. 16 are implemented using the configuration shown in FIG. 17, which switches between omnidirectional 22 and directional 23 antennae 9 (or arrays thereof) using a switch SW, maximum directional coverage may be obtained by cycling which of the sensors $3_1, \ldots, 3_8$ monitors the respective directional antenna(e) 23 at a given time.

The sensors 3 in a given second system 1b may be arranged into one or more groups. For example, in a system with N sensors $3_1, \ldots, 3_N$, a first group may include the sensors $\{3_1, \ldots, 3_{n1}\}$, a second group may include the sensors $\{3_{n1+1}, \ldots, 3_{n2}\}$ and a third group may include the sensors $\{3_{n2+1}, \ldots, 3_N\}$, with n1 and n2 being positive integers which satisfy n1<n2<N. Neither the number of sensors N nor the number of groups they may be divided amongst are limited to particular numbers. A given sensor $3_n$ may belong to a single group, but this is not required, and in some applications there may be some intersections between the groups.

For each group, a directional dataset DIR is received from one sensor 3 belonging to that group at a time, whilst omnidirectional datasets OMNI are received from each other sensor 3 belonging to that group. For the example of the group $\{3_1, \ldots, 3_{n1}\}$ outlined hereinbefore, a directional dataset $DIR_n$ is received for the nth of the n1 sensors $3_1, \ldots, 3_{n1}$ in that group, whilst omnidirectional datasets $OMNI_k$ are received for all k≠n and 1≤k≤n1. Similarly for each other group.

It should be noted that the groups concern which sensor(s) 3 provide directional datasets DIR, and as explained hereinafter in relation to the example shown in FIG. 20, the omnidirectional datasets OMNI used as input to the correlation analysis are not restricted to those originating from the same group as a directional dataset DIR in which an emitter signal 8 has been detected.

Figure 19:
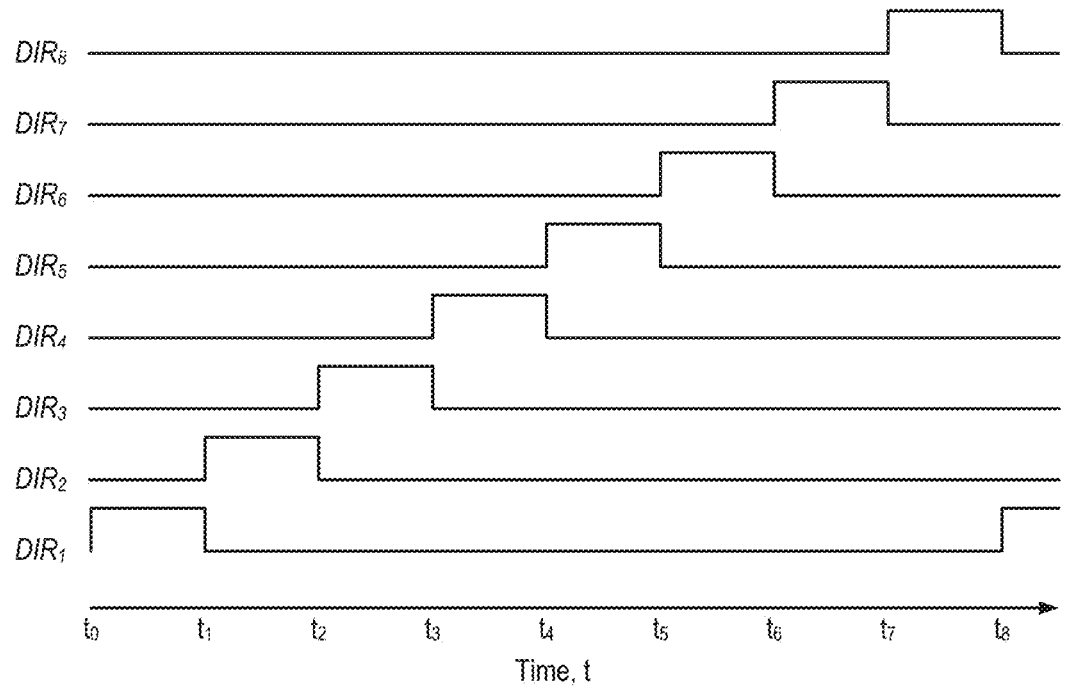
FIG. 19 schematically illustrates a first example of sequencing directional dataset acquisition.

Referring also to FIG. 19, a first example of sequencing directional datasets DIR is illustrated.

The example shown in FIG. 19 is for an implementation in which all eight sensors $3_1, \ldots, 3_8$ of the second system 1b shown in FIG. 16 belong to a single group. In a first period $t_0$-$t_1$, a directional dataset $DIR_1$ is received from a first sensor $3_1$, whilst omnidirectional datasets $OMNI_2, \ldots, OMNI_8$ are received for the remaining sensors $3_2, \ldots, 3_8$. Following this, in a second period $t_1$-$t_2$, a directional dataset $DIR_2$ is received from a second sensor $3_2$, whilst omnidirectional datasets $OMNI_1, OMNI_3, \ldots, OMNI_8$ are received for the remaining sensors $3_1, 3_3, \ldots, 3_8$. The sequence continues in this way until a directional dataset DIR has been obtained for each of the sensors $3_1, \ldots, 3_8$, before repeating.

In this way, there is a chance to detect an unauthorised emission source 2 approaching from any direction, as the sensors $3_1, \ldots, 3_8$ are scanned sequentially.

Figure 20:
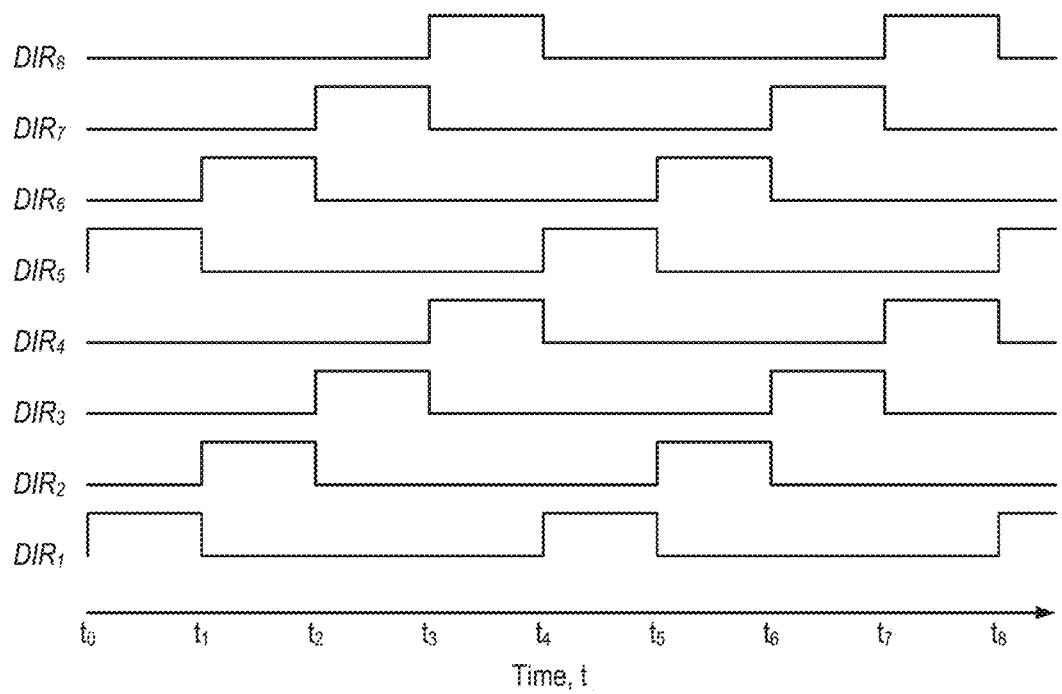
FIG. 20 schematically illustrates a second example of sequencing directional dataset acquisition.

Referring also to FIG. 20, a second example of sequencing directional datasets DIR is shown.

When a second system 1b such as shown in FIG. 16 encompasses a significant area, for example an airport, it is possible that omnidirectional antennae 22 of sensors 3 on an opposite side of the convex hull 5 to a monitored directional antenna 23 of a sensor 3 will either not detect, or detect only weakly, an emission source 2 located in front of that directional antenna 23. For example, if a directional dataset $DIR_1$ is being obtained from the first sensor $3_1$, then the additional distance to, for example, the fifth sensor 35 on the other side of the convex hull may result in no, or a weak, signal in the corresponding omnidirectional dataset $OMNI_5$. Moreover, location finding is more accurate if the sensors 3 used span a wider range of angles to the emission source 2, so that it is generally not optimal to use omnidirectional datasets OMNI corresponding to sensors 3 in line, or near to in line, with the orientation direction of a sensor 3 used to obtain a directional dataset.

Consequently, intervals between scanning in a given direction may be reduced by arranging the sensors 3 into two or more groups which 'chase' each other around the perimeter of the convex hull.

The example shown in FIG. 20 is for an implementation in which the eight sensors $3_1, \ldots, 3_8$ of the second system 1b shown in FIG. 16 are divided into two groups. A first group includes the first to fourth sensors $3_1, 3_2, 3_3, 3_4$, and a second includes the fifth to eighth sensors $3_5, 3_6, 3_7, 3_8$. One sensor from each group provides a directional dataset DIR at any given time.

For example, in the first time period $t_0$-$t_1$, in the first group the first sensor $3_1$ provides a corresponding directional dataset DIRT, whilst in the second group the fifth sensor $3_5$ provides a corresponding directional dataset $DIR_5$. It should be noted that if an emitter signal 8 is detected in either directional dataset DIRT, $DIR_5$, then a correlation based time-of-arrival location finding calculation may still be carried out based on any or all of the radio signal datasets, not just ones originating from the same group. For example, if an emitter signal 8 is determined to be present in the directional dataset DIRT, then the detected signal will be correlated against each of the datasets $OMNI_2, \ldots, OMNI_4$, $DIR_5, OMNI_6, OMNI_7, OMNI_8$, although the possibility of finding a correlation with the oppositely directed directional dataset $DIR_5$ would be expected to be low. If an emitter signal 8 is also detected in the directional dataset $DIR_5$, then a second correlation based time-of-arrival location finding calculation is carried out, looking to correlate the signal determined in $DIR_5$ against each of the datasets DIRT, $OMNI_2, OMNI_4, OMNI_7, OMNI_8$.

Subsequently, in the second time period $t_1$-$t_2$, in the first group the second sensor $3_2$ provides a corresponding directional dataset $DIR_2$, whilst in the second group the sixth sensor $3_6$ provides a corresponding directional dataset $DIR_6$. The sequence continues in this way until a directional dataset DIR has been obtained for each of the sensors $3_1, \ldots, 3_8$, before repeating. However, in contrast to cycling through a single group to start repeating at time $t=t_8$ as in the first example shown in FIG. 19, in the second example, the sequence is completed and starts repeating at time $t=t_4$. In this way, the interval between scanning in a particular direction is halved. The concept may be extended to third, fourth or even more groups, limited only by the need to maintain a sufficient pool of omnidirectional datasets OMNI for effective correlation based time-of-arrival location finding calculations.

In some implementations, there may be knowledge that unauthorised radio sources 2 are more likely to be found/ approach from a particular range of directions. For example, drones may be more likely to approach an airport from land than from sea. In such situations, a sequence for obtaining directional datasets DIR may give a greater fraction of time to one or more sensors 3 which have directional antennae 23 (or arrays) pointed in that range of directions.

Figure 21:
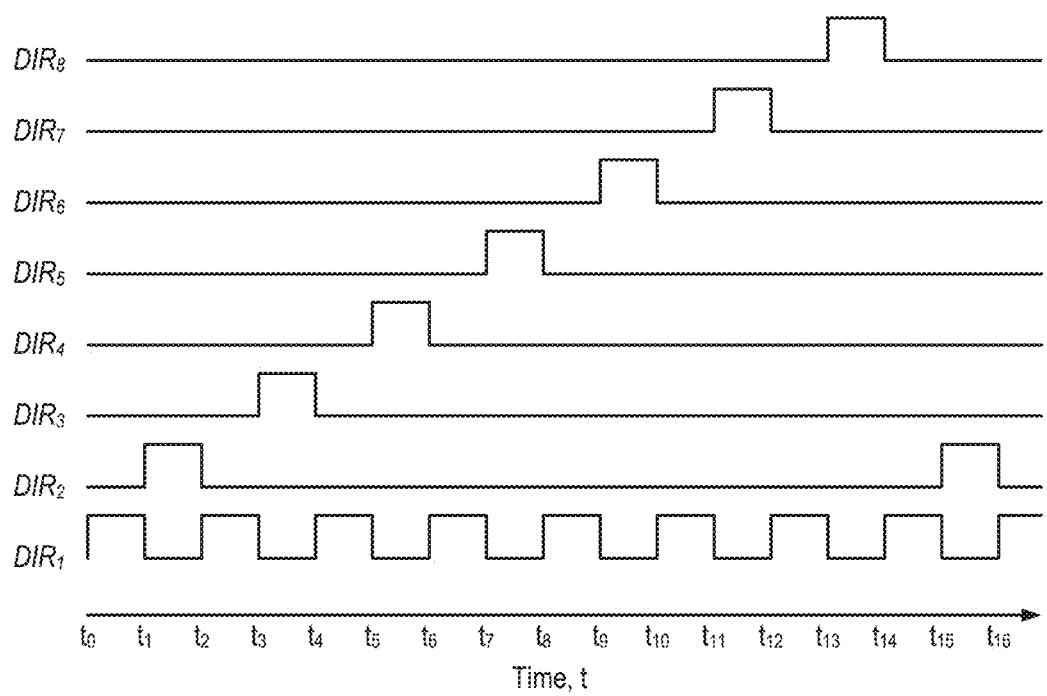
FIG. 21 schematically illustrates a third example of sequencing directional dataset acquisition.

Referring also to FIG. 21, a third example of sequencing directional datasets DIR is shown.

The example shown in FIG. 21 is for an implementation in which all eight sensors $3_1, \ldots, 3_8$ of the second system 1b shown in FIG. 16 belong to a single group. Unlike the first example shown in FIG. 19, in the third example, a directional dataset $DIR_1$ is obtained from the first sensor $3_1$ during every other period, whilst the remaining periods are used to scan through the other sensors $3_2, \ldots, 3_8$. In this way, the region corresponding to a directional antenna 23 of the first sensor 31 is monitored at a regular interval (of duration $t_2$-$t_0$), whilst those corresponding to directional antennae 23 of the other sensors $3_2, \ldots, 3_8$ are monitored with a longer interval (of duration $t_{15}$-$t_1$).

Although the first to third examples shown in FIGS. 19 to 21 have sensors 3 belonging to the same group corresponding to adjacent or proximate physical positions, this is not required. In other examples, sensors 3 belonging to a particular group need not correspond to adjacent or proximate physical locations.

Although in the first to third examples shown in FIGS. 19 to 21 have been illustrated and described with cycling through sensors 3 belonging to each group in a repeating sequence, this is not required. In some implementations, it may be useful to modify a sequence in dependence on detecting a radio emission source 2. For example, the repeating sequence of the first example of FIG. 19 may be used generally, until it is determined that an emitter signal 8 is present in a given directional dataset $DIR_n$ with $1 \leq n \leq N$ (N=8 for the example shown in FIG. 16). In response to making the detection, the scanning may then be switched over to a pattern which monitored the directional dataset $DIR_n$ of the $n^{th}$ sensor $3_n$ more regularly, for example the third example shown in FIG. 21, except focused on the $n^{th}$ sensor instead of the first $3_1$ (unless the detection is for the first sensor $3_1$). The system 1b may stay in the new pattern until the emitter signal 8 is no longer detected in that directional dataset $DIR_n$. In some examples, the system 1b may stay in the new pattern until the later of a minimum period has elapsed or the emitter signal 8 is no longer detected in that directional dataset $DIR_n$. Afterwards, the system 1b may revert to the original sequence until the next time an emitter signal 8 is detected in one of the directional datasets $DIR_1, \ldots, DIR_N$.

System Arranged Along a Border/Coast

Examples have been described in which sensors 3 of a system 1, 1b define a convex hull 5 which is arranged to generally follow the closed perimeter of a region such as an airport and so forth. It has also been described that the second system 1b, and the method of signal detecting and location may use the method illustrated in FIG. 3, which employs conditions in dependence on signal locations r relative to the convex hull 5 (closed perimeter). However, it has also been described that the method for signal detection and location using directional antennae is not limited to this, and may instead use any other suitable correlation based time-of-arrival location finding calculation.

Consequently, the method for signal detection and location using directional antennae is not limited to systems in which the sensors 3 are generally disposed around the entire perimeter of a region.

Figure 22:
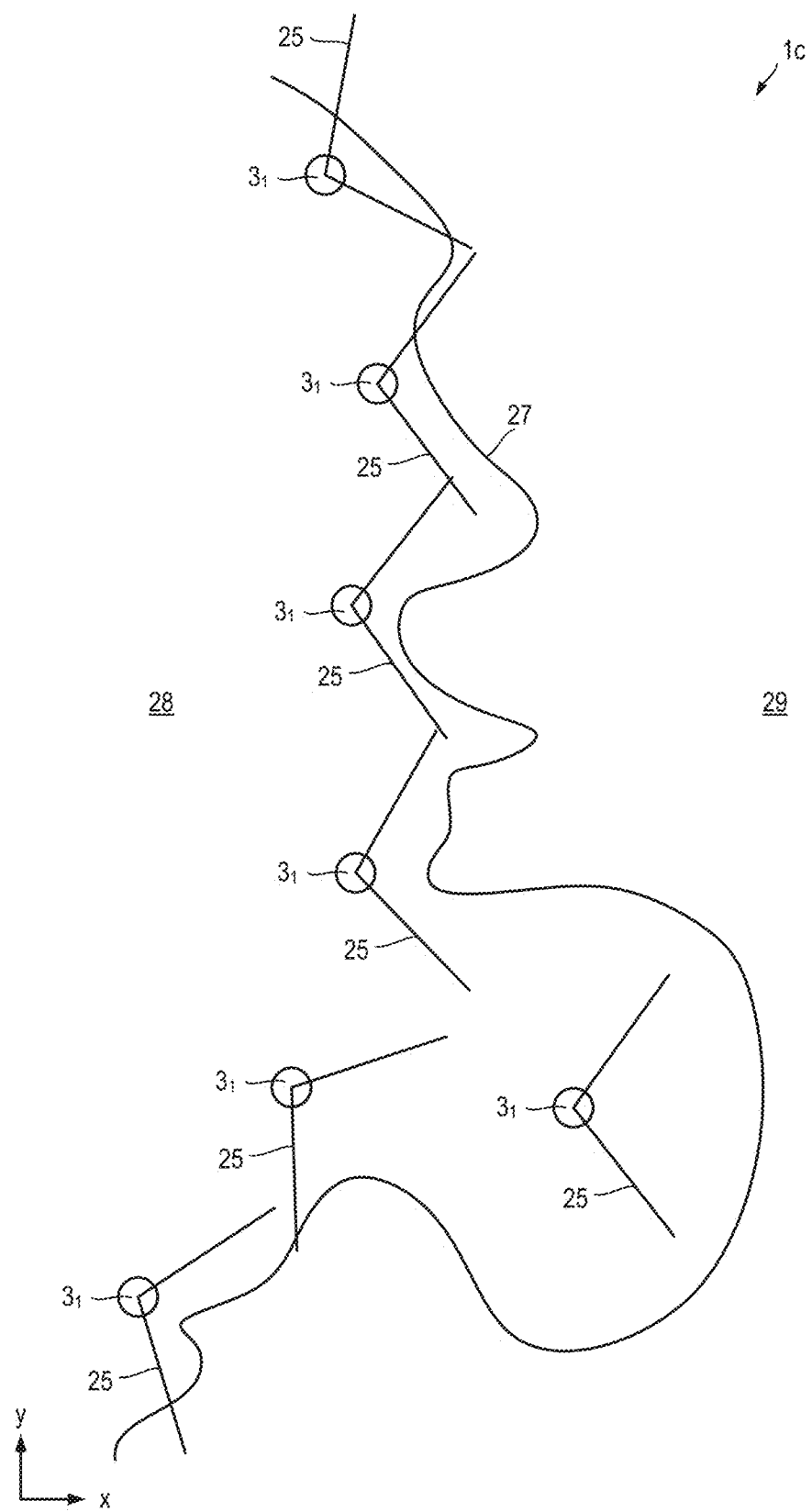
FIG. 22 is a schematic plan view of a third system for radio location finding.

Referring also to FIG. 22, a third system 1c is shown.

The third system 1c is the same as the second system 1b (or the system 1), except that instead of being distributed around (and facing outwards from) the perimeter of a region, the sensors 3 (seven sensors $3_1, \ldots, 3_7$ are shown in FIG. 22) are spaced along a border 27 which delineates a first region 28 and a second region 29. The directional antennae 23 of the sensors $3_1, \ldots, 3_7$ are all directed towards the second region 29, for example because it is desired to preferentially detect, locate and track radio emission sources 2 located in the second region 29. For example, the first region 28 could be land, the second region 29 may be sea/ocean, and the border 27 may be the coastline. In another example, the first region 28 may be one country, the second region 29 a neighbouring country, and the border 27 may be the political border.

In some cases, the directional antennae 23 (or arrays) of sensors 3 of the third system 1c may all be oriented within a given range, for example within ±45 degrees, of a reference direction. In FIG. 22, the reference direction corresponds to the positive x-axis as illustrated.

Although systems 1, 1b, 1c have been described which include particular numbers of sensors 3, in general a system 1, 1b, 1c may include any number N of sensors 3, each of which may include one or more antennae 9 (or antenna arrays) in any combination of omnidirectional 22 and/or directional 23, and also including one or more radio receivers 4.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method of passively detecting a radio emission source, comprising:
   receiving three or more radio signal datasets from three or more respective sensors, the three or more sensors spread across a region, each sensor corresponding to a physical location and comprising at least one radio receiver, wherein the three or more radio signal datasets comprise:
      one or more directional datasets obtained using a directional antenna or a directional antenna array of the corresponding sensor;
      two or more omnidirectional datasets, each obtained using an omnidirectional antenna or an omnidirectional antenna array of the corresponding sensor;
      determining whether an emitter signal within a target frequency range is present in any of the one or more directional datasets of the three or more radio signal datasets;
      for each given directional dataset of the three or more radio signal datasets, in response to the emitter signal is present in the given directional dataset, carrying out a time-difference-of-arrival location finding calculation based on temporal offsets determined based on cross-correlating the emitter signal in the given directional dataset against at least two other radio signal datasets of the three or more radio signal datasets.

2. The method according to claim 1, further comprising outputting a result of the time-difference-of-arrival location finding calculation.

3. The method according to claim 1, wherein one or more of the sensors are dual sensors which comprise:
   a directional antenna or a directional antenna array; and
   an omnidirectional antenna or an omnidirectional antenna array.

4. The method according to claim 3, wherein at least one dual sensor comprises:
   a first radio receiver coupled to the directional antenna or directional antenna array; and
   a second radio receiver coupled to the omnidirectional antenna or omnidirectional antenna array.

5. The method according to claim 3, wherein a radio receiver of at least one dual sensor is configured to be switchable between:
   receiving inputs from the directional antenna or directional antenna array; or
   receiving inputs from the omnidirectional antenna or omnidirectional antenna array.

6. The method according to claim 1, wherein the three or more sensors belong to one or more groups, wherein for each group:
   a directional dataset is received from one sensor belonging to that group at a time, whilst omnidirectional datasets are received from each other sensor belonging to that group.

7. The method according to claim 6, wherein for each group, the sensor from which the directional dataset is received cycles through each sensor belonging to that group in a repeating sequence; or
   wherein for each group, the sensor from which the directional dataset is received is determined in dependence upon a previous result of the time-difference-of-arrival location finding calculation.

8. The method according to claim 1, wherein the physical locations of the sensors define a convex hull, and wherein directional antennae and/or directional antenna arrays of sensors located around the perimeter of the convex hull are each oriented to point outwards from the convex hull.

9. The method according to claim 1, wherein in response to the emitter signal is present in a given directional dataset of the three or more radio signal datasets, the time-difference-of-arrival location finding calculation comprises:
   receiving or retrieving a physical location corresponding to each sensor;
   performing a correlation analysis of the given directional dataset against each other radio signal dataset of the three or more radio signal datasets to determine whether the emitter signal is present in any of the other radio signal datasets of the three or more radio signal datasets, and assigning the given directional dataset and any other radio signal dataset of the three or more radio signal datasets which comprises the emitter signal as a detection dataset;
   in response to determining three or more detection datasets:
      calculating a signal location based on arrival times of the emitter signal and the respective physical locations;
      generating a locus of possible positions based on calculating two or more alternative signal locations, each alternative signal location calculated by adding synthetic noise to one or more of the detection datasets and repeating the calculations used to calculate the signal location;
      in response to the signal location is within the convex hull, applying a first cluster filter to the signal location and previously calculated signal locations within a preceding time period, wherein the first cluster filter applies circular or spherical boundaries having a fixed radius for each of the signal location and the previously calculated signal locations;
      in response to the signal location is outside the convex hull, applying a second cluster filter to the signal location and the previously calculated signal locations within the preceding time period, wherein the second cluster filter applies elliptical or ellipsoidal boundaries for each of the signal location and the previously calculated signal locations, each elliptical or ellipsoidal boundary having a long axis and a short axis with length equal to the fixed radius, wherein a ratio of the long and short axes is equal to a ratio of maximum and minimum distances spanning the respective locus of possible locations, and the long axis is aligned parallel to the maximum distance;

outputting one or more estimated radio emission source locations, each estimated radio emission source location determined based on a respective cluster of signal locations.

10. The method according to claim 9, further comprising: based on the signal location and the previously calculated signal locations within the preceding time period, determining a bearing angle which maximises a number of signal locations within an angular threshold of the bearing angle.

11. The method according to claim 1, wherein a border delineates a first region from a second region, and wherein the physical locations of the sensors are all within the first region, and wherein directional antennae and/or directional antenna arrays of sensors are each oriented to point towards the second region.

12. An apparatus for passively detecting a radio emission source, comprising:
a communications interface configured to receive three or more radio signal datasets from three or more respective sensors, the three or more sensors spread across a region, each sensor corresponding to a physical location and comprising at least one radio receiver, wherein the three or more radio signal datasets comprise:
one or more directional datasets obtained using a directional antenna or a directional antenna array of the corresponding sensor;
two or more omnidirectional datasets, each obtained using an omnidirectional antenna or an omnidirectional antenna array of the corresponding sensor;
the apparatus configured:
to determine whether an emitter signal within a target frequency range is present in any of the one or more directional datasets of the three or more radio signal datasets;
for each given directional dataset of the three or more radio signal datasets, in response to the emitter signal is present in the given directional dataset, to carry out a time-difference-of-arrival location finding calculation based on temporal offsets determined based on cross-correlating the emitter signal in the given directional dataset against at least two other radio signal datasets of the three or more radio signal datasets.

13. A system comprising:
the three or more sensors;
the apparatus according to claim 12, configured to receive respective radio signal datasets from the three or more sensors.

14. The system according to claim 13, wherein one or more of the sensors are dual sensors which each comprise:
a directional antenna or a directional antenna array; and
an omnidirectional antenna or an omnidirectional antenna array.

15. The system according to claim 14, wherein at least one dual sensor comprises:
a first radio receiver coupled to the directional antenna or directional antenna array; and
a second radio receiver coupled to the omnidirectional antenna or omnidirectional antenna array.

16. The system according to claim 14, wherein a radio receiver of at least one dual sensor is configured to be switchable between:
receiving inputs from the directional antenna or directional antenna array; or
receiving inputs from the omnidirectional antenna or omnidirectional antenna array.

17. The system according to claim 13, wherein the three or more sensors belong to one or more groups, wherein the system is configured, for each group, to receive a directional dataset from one sensor belonging to that group at a time, whilst omnidirectional datasets are received from each other sensor belonging to that group.

18. The system according to claim 17, wherein the system is configured, for each group, such that the sensor from which the directional dataset is received cycles through each sensor belonging to that group in a repeating sequence; or
wherein the system is configured, for each group, such that the sensor from which the directional dataset is received is determined in dependence upon a previous result of the time-difference-of-arrival location finding calculation.

19. The apparatus according to claim 12, wherein the physical locations of the sensors define a convex hull, and wherein directional antennae and/or directional antenna arrays of sensors located around a perimeter of the convex hull are each oriented to point outwards from the convex hull; or
wherein a border delineates a first region from a second region, and wherein the physical locations of the sensors are all within the first region, and wherein directional antennae and/or directional antenna arrays of sensors are each oriented to point towards the second region.

20. The apparatus according to claim 12, wherein each sensor is configured to transmit the corresponding radio signal dataset continuously or
wherein each sensor is configured to locally cache the respective radio signal dataset and to transmit the cached radio signal dataset to the apparatus in batches.

* * * * *